US011698473B2

(12) United States Patent
Torlov et al.

(10) Patent No.: US 11,698,473 B2
(45) Date of Patent: Jul. 11, 2023

(54) SYSTEMS AND METHODS FOR WORKFLOW TO PERFORM WELL LOGGING OPERATIONS TRACKING AND EFFICIENCY ASSESSMENT

(71) Applicant: Saudi Arabian Oil Company, Dhahran (SA)

(72) Inventors: Vladislav Torlov, Dhahran (SA); Clovis Bonavides, Dhahran (SA); Majed Kanfar, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 254 days.

(21) Appl. No.: 17/151,961

(22) Filed: Jan. 19, 2021

(65) Prior Publication Data
US 2022/0229200 A1   Jul. 21, 2022

(51) Int. Cl.
*G01V 1/50* (2006.01)
*G01V 1/46* (2006.01)
*G06F 18/24* (2023.01)

(52) U.S. Cl.
CPC ............ *G01V 1/50* (2013.01); *G01V 1/46* (2013.01); *G06F 18/24* (2023.01)

(58) Field of Classification Search
CPC .......... G01V 1/50; G01V 1/46; G06K 9/6267; G06Q 50/02; G06Q 10/0639
See application file for complete search history.

(56) References Cited

U.S. PATENT DOCUMENTS

| 9,850,712 | B2 | 12/2017 | Sugiura |
| 2015/0088424 | A1 | 3/2015 | Burlakov et al. |
| 2018/0298746 | A1 | 10/2018 | Short et al. |
| 2019/0049621 | A1 | 2/2019 | Teague et al. |

(Continued)

FOREIGN PATENT DOCUMENTS

| WO | 2018232198 A1 | 12/2018 |
| WO | 2020072720 A1 | 4/2020 |

(Continued)

OTHER PUBLICATIONS

Puskarczyk, "Artificial neural networks as a tool for pattern recognition and electrofacies analysis in Polish palaeozoic shale gas formations", Acta Geophysica, vol. 67, pp. 1991-2003, Sep. 20, 2019.

(Continued)

*Primary Examiner* — Daniel Pihulic
(74) *Attorney, Agent, or Firm* — Dinsmore & Shohl LLP

(57) ABSTRACT

Systems and methods identify events during a well operation. Systems and methods receive data identifying parameters for the event related to the downhole well. An interactive graphical representation of a hierarchical taxonomy for selection of a selected classification for the event is displayed. The hierarchical taxonomy includes a plurality of classifications of well operation. A tool for identification and classification for the event is presented. The tool also serves for the purpose of data collection to allow development of automatic well operation events recognition models. The data identifying the parameters for the event are compared to historic data related to a plurality of events identified with the selected classification to determine one or more performance parameters for the event.

21 Claims, 18 Drawing Sheets

(56) References Cited

U.S. PATENT DOCUMENTS

| | | | |
|---|---|---|---|
| 2019/0147125 A1 | 5/2019 | Yu et al. | |
| 2020/0362686 A1 | 11/2020 | Puwanto et al. | |
| 2022/0229200 A1* | 7/2022 | Torlov | G06Q 10/0639 |

FOREIGN PATENT DOCUMENTS

| | | | |
|---|---|---|---|
| WO | 2020154399 A1 | 7/2020 | |
| WO | WO-2022159124 A1 * | 7/2022 | G01V 1/46 |

OTHER PUBLICATIONS

NeuraLog, "NeuraLog—automated well log digitizing and preparation of log data", https://www.neuralog.com/pages/NeuraLog, Sep. 23, 2020.

International Search Report and Written Opinion dated Sep. 21, 2021 pertaining to International application No. PCT/US2021/028386 filed Apr. 21, 2021, 13 pages.

\* cited by examiner

RunGUI

Job  
Logging Unit  2123  Start  01283  Pick!  
Log Engineer  Ivan  End  12010  Pick!

Events List & Display Control

Save Table | Save Table as | Import Table | Output File  
Event Time | Event Depth | | Picked Event | Add Event! | Erase Row | Erase Table  
| | | | | SHOW all | HIDE all

| | TIME | DATE | DEPTH | EVENT | REMARKS | INCDT | SHOW | RUN |
|---|---|---|---|---|---|---|---|---|
| 25 | 11.1629 | Mar / 31 / 20 - 07:09:49 | 102.8 | Tool Zero Check | | ☐ | ✓ | 1 |
| 26 | 11.1906 | Mar / 31 / 20 - 07:11:27 | 109.3 | Safety briefing | | ☐ | ✓ | 1 |
| 27 | 11.2462 | Mar / 31 / 20 - 07:14:47 | 109.7 | Rig down logging string | | ☐ | ✓ | 1 |
| 28 | 12.0012 | Mar / 31 / 20 - 08:00:05 | 135.3 | Rig up logging string | | ☐ | ✓ | 2 |
| 29 | 12.7031 | Mar / 31 / 20 - 08:42:12 | 109.1 | Tools Operational Checks | | ☐ | ✓ | 2 |
| 30 | 12.9228 | Mar / 31 / 20 - 08:55:23 | 100.2 | Load RA sources | | ☐ | ✓ | 2 |
| 31 | 13.2485 | Mar / 31 / 20 - 09:14:56 | 29.0 | RIH in Casing | | ☐ | ✓ | 2 |
| 32 | 13.3495 | Mar / 31 / 20 - 09:20:59 | 303.4 | Tools check in CH (RIH) | | ☐ | ✓ | 2 |
| 33 | 13.3723 | Mar / 31 / 20 - 09:22:21 | 305.4 | RIH in Casing | | ☐ | ✓ | 2 |
| 34 | 13.4404 | Mar / 31 / 20 - 09:26:26 | 501.6 | Tools check in CH (RIH) | | ☐ | ✓ | 2 |
| ... | | | | | | | | |
| 51 | 26.8536 | Mar / 31 / 20 - 22:51:14 | 72.4 | Rig down logging string | | ☐ | ✓ | 2 |
| 52 | 27.4911 | Mar / 31 / 20 - 23:29:29 | 46.0 | Rig up logging string | | ☐ | ✓ | 3 |
| 53 | 27.8477 | Mar / 31 / 20 - 23:50:53 | 68.4 | Tools Operational Checks | | ☐ | ✓ | 3 |

FIG. 5

SYSTEMS AND METHODS FOR WORKFLOW TO PERFORM WELL LOGGING OPERATIONS TRACKING AND EFFICIENCY ASSESSMENT

TECHNICAL FIELD

The present disclosure relates to well logging and, in particular, systems and methods for identification and tracking of events related to a borehole operation.

BACKGROUND

The practice of well logging or borehole logging makes a log of records of the geological formation penetrated during borehole formation. Traditionally, logs are based either on visual inspection of samples brought to the surface (geological logs) or on physical measurements made by instruments lowered into the borehole (geophysical logs). These logs are used for boreholes drilled for various resources, such as oil and gas, groundwater, or minerals.

Many factors may influence wellbore formation and utilization, such as lithology changes, mud type, tectonic stresses, angle of a well (e.g., vertical, albeit minor, etc.), human deviation, environmental factors, or the like. Attempts at field planning generally rely on various factors to identify and assess an environment, drilling of more bores, and production.

Systems and methods to collect and analyze well logging operations and data may be desired. In another aspect, systems and methods for improve well logging operations and well assessment may be desired.

SUMMARY

A method of logging well operations is disclosed. The method may include receiving, using one or more processors, data identifying parameters for an event related to a downhole well; identifying a classification for the event from a hierarchical taxonomy of well operation classifications of events, based at least in part on the data identifying the parameters; comparing the data identifying the parameters for the event to historic data related to a plurality of events identified with the classification to determine one or more performance parameters for the event; and in response to the one or more performance parameters exceeding a threshold identifying a target performance, identifying at least one of a quality incident or influence factor related to the one or more performance parameters exceeding the threshold. The method may further include displaying, on an electronic display, a graphical representation of composite well log signatures, and receiving input to at least one of place, move, or delete an event on the graphical representation of composite well log signatures. In some examples, the method may include displaying, on an electronic display, a graphical representation of the hierarchical taxonomy for selection of the classification, and receiving an indication of the classification from the electronic display. The hierarchical taxonomy may include a tree of events, and wherein only terminal nodes may be selectable as the classification. Identifying at least one of a quality incident or related influence factor may further comprise determining a probability that the influence factor is a cause for the one or more performance parameters exceeding the threshold identifying the target performance, and in response to the probability exceeding a probability threshold, identifying the influence factor. Receiving data identifying parameters for the event related to the downhole well may include receiving at least one of logging job parameters, drilling parameters, or high resolution logging data. The receiving data may comprise receiving the data from a well tool or surface acquisition sensor. In at least some examples, the method may comprise identifying the classification from a plurality of classifications of the hierarchical taxonomy based on a weighted model configured to select the classification based on at least one of the data identifying parameter or a historical record of parameters related to past events. The method may further comprise, displaying, on an electronic display, a graph of selected parameters of the parameters for an even and graphical representations of events associated with parameters at points along the graph. The method may further comprise predicting improvements to the event based on the data identifying the parameters and sending a notification of the improvements to at least one party. In another example, the method may further comprise lowering at least one well tool into the downhole well, and wherein the data identifying the parameters includes well tool data recorded by the at least one well tool. In another aspect, a method may collect the historic data and develop automatic well logging operations events recognition models based on the historic data.

Also described herein is a system comprising one or more processors; and one or more memory modules comprising non-transitory computer-readable medium storing instructions that, when executed by the one or more processors, cause the one or more processors to: receive data identifying parameters for an event related to a downhole well; identify a classification for the event from a hierarchical taxonomy of well operation classifications of events, based at least in part on the data identifying the parameters; compare the data identifying the parameters for the event to historic data related to a plurality of events identified with the classification to determine one or more performance parameters for the event; and in response to the one or more performance parameters exceeding a threshold identifying a target performance, identify at least one of a quality incident or influence factor related to the one or more performance parameters exceeding the threshold. The hierarchical taxonomy may include a tree structure, and wherein terminal nodes of the tree structure are identifiable as the classification. The tree structure may include a plurality of nodes related to unintended events. The computer-readable instructions may further cause the one or more processors to identify an unintended event from the plurality related to unintended events based on the data identifying parameters for the event. In at least one example, the computer-readable instructions may further cause the one or more processors to identify the quality incident based on determining a deviation of a time period for the event that exceeds a threshold, such as a threshold deviation from a benchmark associated with past events having the classification, a threshold deviation from a majority, or the like. The computer-readable instructions may further cause the one or more processors to determine the benchmark associated with the past events based on a calculated metric of time periods for the past events considering various job parameters.

Further disclosed is a system for selecting a well completion process comprising one or more processors; and one or more memory modules comprising non-transitory computer-readable medium storing instructions that, when executed by the one or more processors, cause the one or more processors to: receive data identifying parameters for an event related to a downhole well; displaying, on an electronic display, a graphical representation of a hierarchical taxonomy for selection of a selected classification for the event, wherein the hierarchical taxonomy includes a plurality of classifications of well operation; receiving input identifying the selected classification for the event; compare the data identifying the parameters for the event to historic data related to a plurality of events identified with the selected classification to determine one or more performance parameters for the event; and in response to the one or more performance parameters exceeding a threshold identifying a target performance, identify at least one of a quality incident or influence factor related to the one or more performance parameters exceeding the threshold. The one or more performance parameters may include a temporal parameter, and wherein the one or more influence factor includes at least one of equipment associated with the event, personnel associated with the event, location associated with the event, a rig identifier associated with the event, season associated with the event, or weather associated with the event. The computer-readable instructions may further cause the one or more processors to identify a selected influence factor from the one or more influence factor as a candidate cause for the performance parameters exceeding the threshold. The selected influence factor may be selected based on calculating a probability that the selected influence factor is the most likely cause.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE DRAWINGS

FIG. 5 graphically illustrates an example interface for summarizing identified events according to one or more embodiments described and illustrated herein;

DETAILED DESCRIPTION OF THE DISCLOSURE

Embodiments of the present disclosure are directed to systems and methods for identifying, tracking, and assessing events during well operations. More particularly, embodiments provide a robust workflow which may capture operations, data relevant to operations, identify events, and analyze operations for well operation improvements or modifications. Examples may be applied to various well operations using various attributes (e.g. for logging while drilling, well cementing or hydraulic fracturing operations). An example described herein utilizes systems and methods that employ a workflow in wireline well logging operations.

Figure 1:
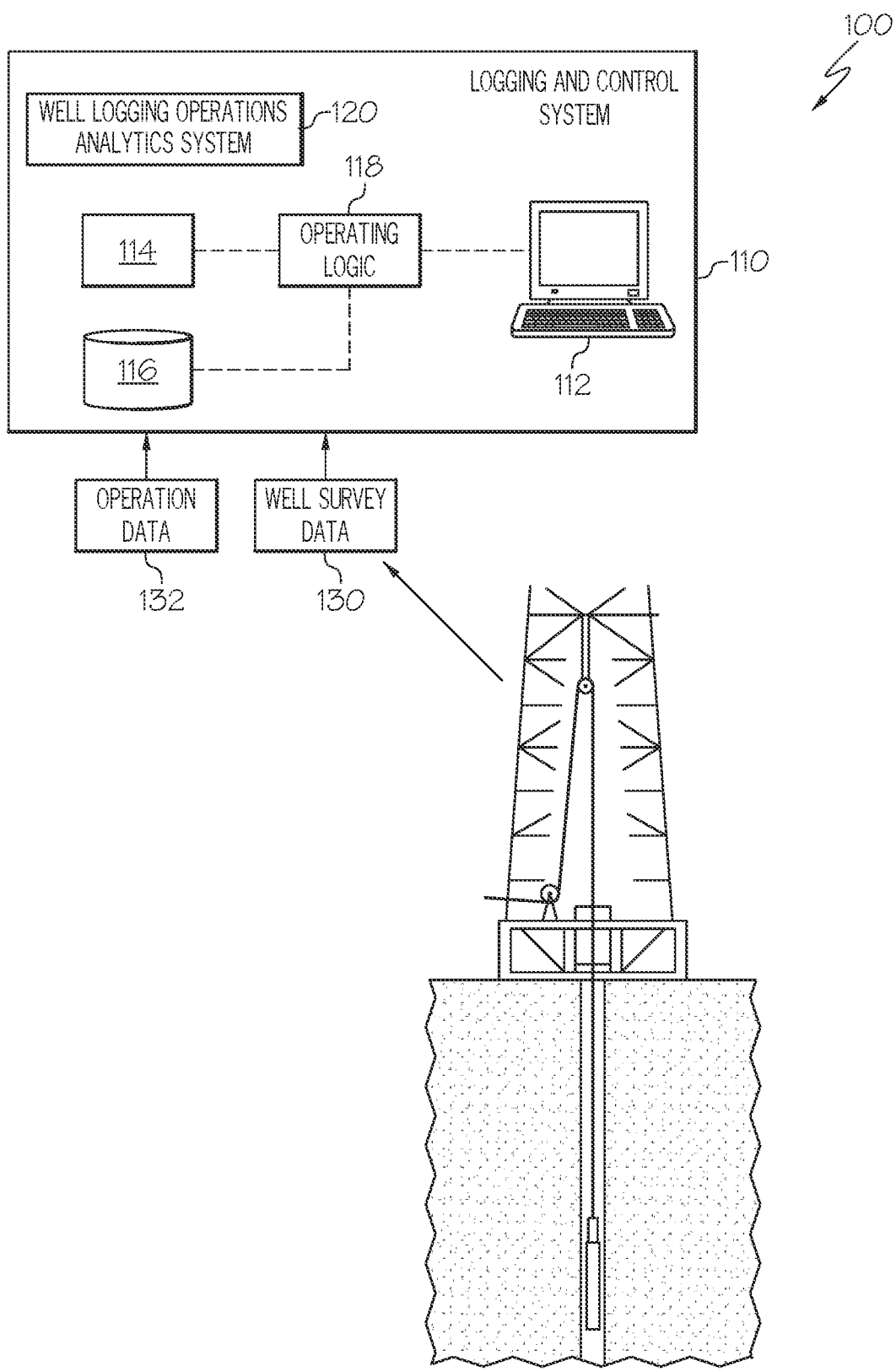
FIG. 1 schematically illustrates a system for identifying, tracking, and assessing events during a well operation according to one or more embodiments described and illustrated herein.

In wireline well logging, a wireline tool is deployed in a wellbore via a wireline. The wireline may be an electromechanical cable, solid wireline cable (slickline), conductor slickline. Logging tools, lowered down into wellbore using wireline may also be conveyed utilizing coiled tubing, drill pipe, tubing-well tractor or the like. Some embodiments may utilize pump-down methods. Readings from the wireline tool may be transmitted to the surface or stored in tool memory. The wireline tool may comprise a core sampling tool, nuclear magnetic resonance (NMR) tool, imaging tools that may capture electrical images, or the like disposed in a well bore Referring now to the figures, FIG. 1 schematically illustrates a system 100 for identifying, tracking, and assessing events during a well operation. A logging and control system 102 may manage well operations related to a rig 140, borehole 104, or other recourse. The well operations may include one or more jobs or sequences of jobs. A job may include a call to execute certain activities and may have a defined temporal start and temporal end. A job sequence may comprise a sequence of events (e.g., activities with temporal starts and ends between activities), the events may be planned or unplanned (e.g., incidents). Events may be defined based on a hierarchical taxonomy. The hierarchical taxonomy may comprise an events tree which may include all jobs available for a particular resource field or well operation. According to some embodiments, a job may further comprise job parameters. Job parameters may include data describing equipment, personnel, location, a rig identifier, season, weather, or other elements which may influence operations of events.

The logging and control system 110 may be various well operations, including well operations for logging-while-drilling, artificial lift, measuring-while-drilling, wireline logging, or the like. It is noted that the logging and control system 110 may be located on a surface 102, below the surface 102, in a vehicle, remotely from the borehole 104, or otherwise disposed. The logging and control system 110 may receive information from one or more sensors or tools 142. The tools 142 may be comprised of wireline tools or other well logging tools. For instance, the tools 142 may comprise sensors or measuring devices that may provide well survey data 130, such as tension, instrument depth, cable speed, and the like which may be measured downhole or at surface by well tools. According to embodiments, the tools 142 may be lowered or otherwise disposed in the borehole 104 via a wireline 144.

It is further noted that while the logging and control system 110 may comprise a computing device, such as a personal computing device, server computing device, mobile computing device, smart phone, tablet computer, wearable device, set top box, or the like. Such computing devices may include various other devices that may comprise hardware and/or software (e.g., program threads, processes, computer processors, non-transitory memory devices, etc.). It is noted that such computing devices may perform some or all functions described herein. Additionally, logging and control system 110 may represent a plurality of computers, servers, databases, or other devices communicatively coupled together. The logging and control system 110 may comprise a non-transitory computer-readable medium and may communicate via networks embodied as hardware, software, and/or firmware, according to embodiments shown and described herein. In embodiments, the logging and control system 110 may include hardware, software, and/or firmware. In at least some embodiments, the logging and control system 110 may be configured as a special purpose computer designed specifically for performing the functionality described herein.

The logging and control system 110 may include a processor 114 a memory component 116. The memory component 116 may include a data store. The memory component 116 may be configured as volatile and/or non-volatile memory and, as such, may include random access memory (including SRAM, DRAM, and/or other types of random access memory), flash memory, registers, compact discs (CD), digital versatile discs (DVD), and/or other types of storage components. Additionally, the memory component may be configured to store operating logic 118 and well logging operations analytics system 120 (each of which may be embodied as a computer program (i.e., computer readable instructions), firmware, or hardware, as an example). The processor 114 may include any processing component configured to receive and execute computer readable instructions (such as from memory component 116). In another aspect, the logging and control system 110 may include input/output hardware 112, which may include a monitor, keyboard, mouse, printer, camera, microphone, speaker, and/or other device for receiving, sending, and/or presenting data. As described herein, the logging and control system 110 may communicate to other devices via a network, such as through network hardware that may include any wired or wireless networking hardware, such as a modem, LAN port, wireless fidelity (Wi-Fi) card, WiMax card, mobile communications hardware, and/or other hardware for communicating with other networks and/or devices.

The operating logic 118 may include an operating system and/or other software for managing components of the logging and control system 110. In another aspect, the well logging operations analytics system 120 may be configured to analyze well logging operations as described herein. For example, the well logging operations analytics system 120 may receive data identifying parameters for an event related to a downhole well. The parameters may include well survey data 130 or well operation data 132. The well logging operations analytics system 120 may receive the well survey data 130 (for example downhole tension or other survey) from tools 142, and may receive well operation data 132 from user computing devices, surface system measurements (such as depth, tension), other well devices, or the like. The well operation data 132 may comprise job parameters associated with a job that may influence operational events that is otherwise not provided by well tools, such as location, rig identification, personnel associated with a job, season, weather, user input, or other information that may be captured and grouped based on a job.

In embodiments, the well logging operations analytics system 120 may implement a workflow that may allow for use of captured data (e.g., well survey data 130, operation data 132, etc.) relative to a job to identify events, summarize duration of events, analyze events, identify job outliers and anomalies in comparison to historic data, perform statistical analysis, data mining, and machine learning or deep learning.

According to examples, well logging operations analytics system 120 may additionally or alternatively render user interfaces that may receive user input and generate displays. As further described herein, a user interface may allow for gathering of representative data, visualization of well operations, events classification (e.g., picking, labelling, etc.) of jobs or events, data storage, and analytical assessment. It is noted that described user interfaces may provide for visualization of data through interactive interfaces and may provide a user with access to records for well operations. Moreover, data associated with jobs can be input to exploratory data analysis algorithms contained within well logging operations analytics system 120 to access jobs, identify parameters for improvements, generate suggestions, or the like.

The well logging operations analytics system 120 may utilize historic data related to prior events of the same classification to compare with data identifying the parameters for a current event to determine one or more performance parameters for the event. In embodiments, the well logging operations analytics system 120 may determine a target performance for the subject event based on the historic data. For instance, the well logging operations analytics system 120 may identify and provide a temporal baseline as a target performance parameter (e.g., expected time for completion) for operational steps and sequences of a job, such as based on analysis of historic events stored in memory component 116, or the like. The temporal baseline may identify estimated time for completion of one or more operational steps, jobs, or sequences of jobs based on temporal data associated with past operational steps, jobs, or sequences of jobs. The estimated time may be based on an average, median, or other analysis of time for past operational steps, jobs, or sequences of jobs. In embodiments, the well logging operations analytics system 120 may identify influence factors affecting the levels of performance for operational steps, jobs, or sequences of jobs based on measured data and historic data. Described embodiments may reduce the level of subjective bias in analysis of well logging operations (or other types of operations) by providing objective and data driven analysis of well operations. Identification of factors that may be positively or negatively effecting performance (e.g., increasing time to perform, incident reports, etc.) may allow for process improvements that may be automatically suggested by the well logging operations analytics system 120.

In another aspect, the well logging operations analytics system 120 may receive operation data 132 to track service quality incidents and determine the cause or possible cause based on an analysis of the operation data 132. For instance, the well logging operations analytics system 120 may receive input from a user computing device that may identify a service quality incident. The well logging operations analytics system 120 may track a history of service quality incidents to identify common factors in incidents, such as personnel, equipment, locations, rigs, or other factors that may be associated with quality, safety or other types of incidents.

Before, during or after well operations, well logging operations analytics system 120 may track wellbore conditions with associated quantitative drilling or well attributes. The attributes may comprise or be correlated with specific drilling parameters, geological parameters (such as well formation, soil or earth material, etc.), and/or to conditions and characteristics of the employed resources (equipment, personnel, etc.). Such information provides a valuable reference for performing future logging operations, both for the operator and for the services provider. Drilling parameters may comprise well parameters such as well depth, geometry, depth, pressure, temperature, gauge, etc. In another aspect, drilling parameters may comprise maximum well curvature, borehole fluid type and its properties, design of drilling bottom hole assembly, types of tools employed, maximum tool length, maximum exposure times, minimum qualifications of personnel, required training, etc.

According to some embodiments, the well logging operations analytics system 120 may instruct memory component 116 to store output data in a format that allows for use of stored data to create automated, or human-assisted events recognition models. For instance, events or jobs may be categorized or labeled utilizing a hierarchical events tree as described herein. The well logging operations analytics system 120 may label events according to the hierarchical events tree to categorize events.

Event recognition models may be created or utilized by deep learning (recurring neural networks, convolution engines, or other). For instance, embodiments may utilize artificial intelligence, statistical models, or other processes and/or algorithms. As an example, classifiers may be mapped to an attribute vector to a confidence that the attribute belongs to a class or is associated with an event, incident, or the like. An input attribute vector, $x=(x1, x2, x3, x4, xn)$ may be mapped to $f(x)=confidence(class)$. Such classification can employ a probabilistic and/or statistical based analysis (e.g., factoring into the analysis drilling parameters, personnel parameters, or the like) to infer an action that a user desires to be performed, improvements to suggest, workflow modifications or the like. In various embodiments, systems and methods may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority.

It should be understood that the components illustrated in FIG. 1 are exemplary and are not intended to limit the scope of this disclosure. More specifically, while the components in FIG. 1 are illustrated as residing within the logging and control system 110, this is a non-limiting example. In some embodiments, one or more of the components may reside external to the logging and control system 110. The logging and control system 110 may include similar hardware, software, and/or firmware. Further aspects of the well logging operations analytics system 120 will be described herein.

Figure 2:
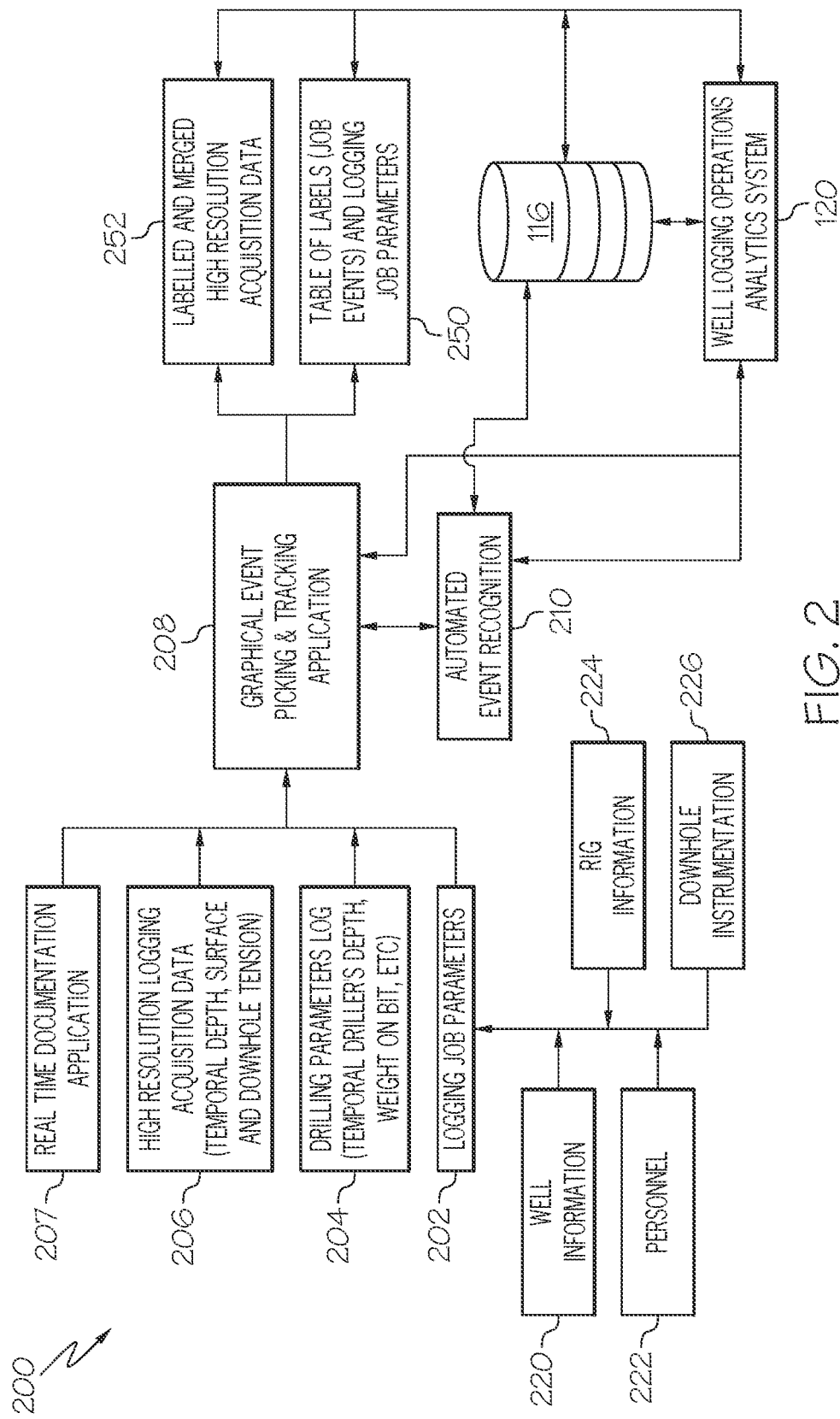
FIG. 2 schematically illustrates an example methodology that may implement a workflow according to one or more embodiments described and illustrated herein.

Turning to FIG. 2, there is a schematic of a methodology 200 that may implement a workflow as described herein. It is noted that aspects of methodology 200 may be implemented by system 100. The methodology 200 may capture logging events, perform assessment of performance of events, and temporally track logging events as described herein. While the methodology 200 is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described herein. Various actions may be completed by one or more of users, mechanical machines, automated assembly machines (e.g., including one or more processors or computing devices), or the like. Moreover, methodology may utilize data stored in memory component 116 and well operations log 120 as described with reference to FIG. 1.

At 202, embodiments may gather logging job parameters before, during, or after an event. The job parameters may comprise, for example, well information 220, personnel information 222, rig information 224, downhole instrumentation or well tool information 226, and the like. In examples, the logging job parameters may be gathered based on user input, such as input provided via a user interface. In some examples, parameters may be provided from devices, such as well tools. Moreover, personnel information may be provided from a scheduling system, time clocks, employee badge identifications, or the like.

At 204, embodiments may gather and record drilling parameters in a log. The drilling parameters may identify a maximum well curvature, borehole fluid type and its properties, design of drilling bottom hole assembly, types of tools employed, parameters of a tool (e.g., weight on bit, etc.), maximum tool length, maximum exposure times, minimum qualifications of personnel, required training, or the like. In an example, for instances of pipe-conveyed logging, fishing operations, or other rig events when logging tools are at surface, drilling parameters including the temporal drilling assembly (driller's) depth, weight on bit, and well geometry data may be particularly applicable.

At 206, embodiments may gather high resolution logging data. Such data may include temporal depth, surface and downhole tensions, or the like. Similar to the description of reference numeral 202, embodiments may gather information at 204 and 206 from user input, automatically from devices, or the like.

A real time documentation application 207 may receive and provide data to allow a user to input events from a hierarchical taxonomy. It is noted that the real time documentation application at 207 may be deployed by an acquisition station, a mobile device, or the like. In some examples, the real time documentation application at 207 may allow for accurate capturing of events and their time for the activities, which may not always discernable from acquisition logs patterns. During job post-processing, data from real-time documentation application received by the graphical event picking and tracking application 208 may populate events from database 116 according to the time of occurrence. User can then refine or fine tune events position if necessary. This real time documentation application may be a stand-alone application or may be part of well logging operations analytics system 120.

A graphical event picking and tracking application 208 may provide an interface that may allow for graphical event picking by a user, operation tracking, or other aspects. In an example, the well logging operations analytics system 120 may provide interactive graphical interfaces via one or more software applications on one or more computing devices. The interfaces may include graphical displays that may, for instance, provide dedicated zoom-able window displaying several raw logging acquisition system data curves.

In at least some embodiments, automated event recognition may be provided at 210. In either manual event picking by a user utilizing an interface or automated event recognition, embodiments may utilize a table of labels 250 to label events at 252. It is noted that the table of labels 250 may comprise a hierarchical taxonomy, which may allow for utilization of stored data, extensibility, and structured well logging. Moreover, events may be associated with data received at 202, 204, 206, or other stored or input data.

The well logging operations analytics system 120 may, at 210, recognize one or more events from a plurality of events. The well logging operations analytics system 120 may recognize events based on log data patterns, prior job data, or the like. As described here and elsewhere, events may include or be associated with event parameters, such as formation pressure measurements, fluid sampling or core acquisition information. The representative data for such occurrences may be utilized to support event identification. It is noted that the well logging operations analytics system 120 may utilize artificial intelligence methods, such as recurring neural networks, to automate or semi-automate event labelling based on a taxonomy. Moreover, embodiments may utilize automated event identification for some, all, or no events. For instance, embodiments may utilize manual identification at 208 and automated identification at 210 in circumstances where an event is frequently performed as may be indicated by log patterns, such as formation tester pretests, sidewall coring measurements, borehole seismic survey or depth logging sequences. The methodology may associate identified events with appropriate parameters, which may be manually entered, connected using relational database processes, or the like. It is noted that users may verify identified events, modify identified events, opt out of automated event identification, or otherwise manage event identification settings.

Embodiments may perform analysis of events via the well logging operations analytics system 120. As described herein, analysis may include comparison of event duration to historic events. The comparison may allow the well logging operations analytics system 120 to identify deviations from average durations, update average durations, recommendations for improvements, or the like. In some examples, well logging operations analytics system 120 may identify causes for deviation, generate suggestions for improvements, or otherwise assist in planning of well operations. According to at least one aspect, embodiments may reduce assessment inaccuracies and increase objectivity of analysis.

The well logging operations analytics system 120 may improve or generate suggestions for logging operations improvements or other well operations by identifying events at 208/210 and linking information from a particular acquisition to past events via the hierarchical taxonomy.

In another aspect, well logging operations analytics system 120 may instruct memory component 116 to store an event history. The event history may include parameters related to the welling operations, such as subsurface formation units, or other information. Well logging operations analytics system 120 may update analytical information based on the stored event history. In at least one embodiment, recording of events associated with high logging tension correlated to wellbore environmental parameters and formation units may be particularly useful in planning future wells or well operations.

Well logging operations analytics system 120 may additionally or alternatively monitor incidents, such as unintended events, which may be manually or automatically classified. Such incidents may be identified via reports, notifications, or the like so that a user may not need to search through records.

Further described herein are exemplary interfaces that may provide for display of event sequences, job summaries, comparative analysis, key performance indicators of well operations, or the like. Embodiments utilizing such interfaces may allow for performance of objective assessment of job events, sequences and their duration taking into account multiple factors contained in the job record.

Figure 3:
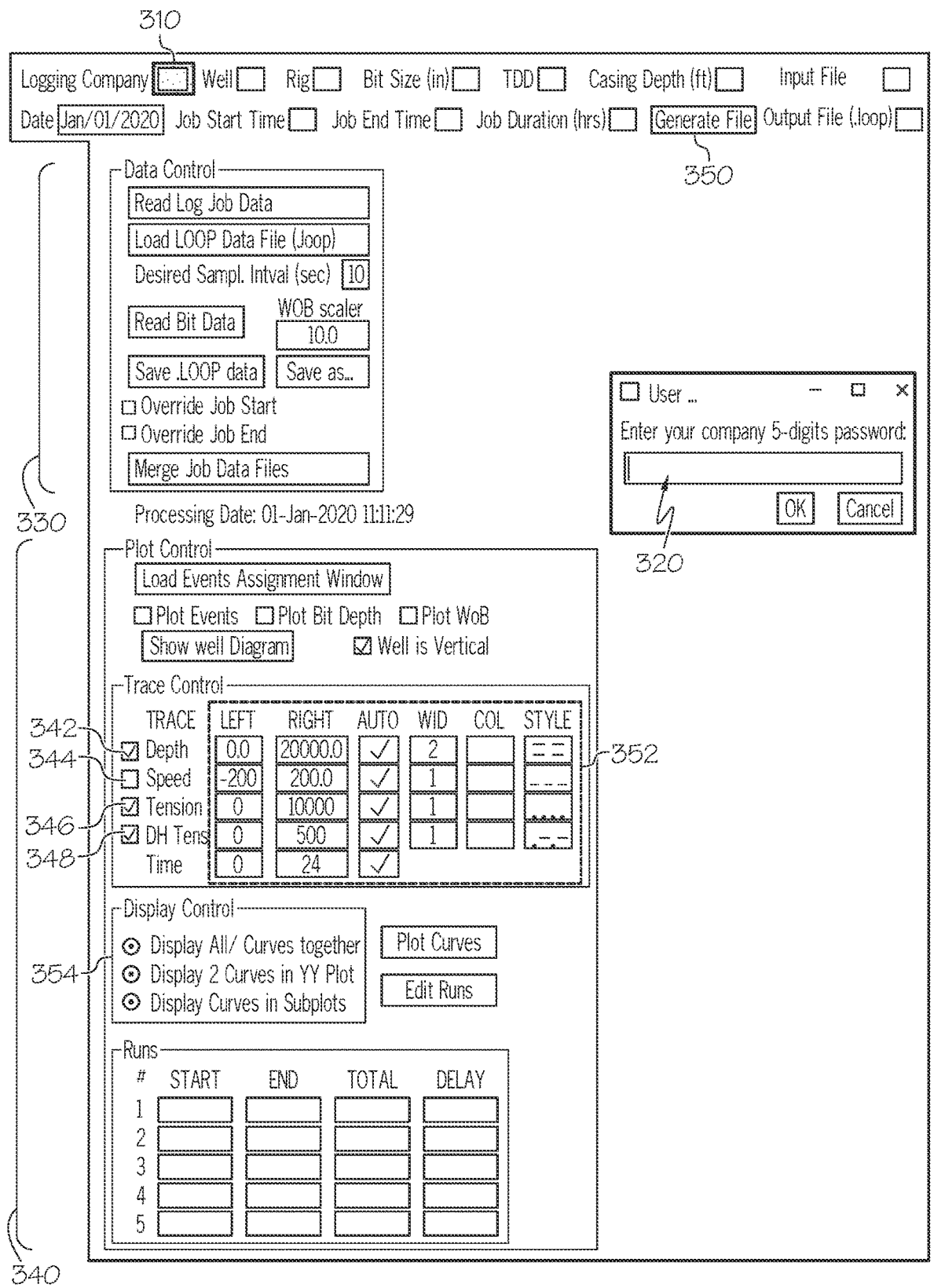
FIG. 3 graphically illustrates an example interface for identification of an event and tracking of parameters according to one or more embodiments described and illustrated herein.

Referring now to FIG. 3, there is an exemplary interface 300 for identification of an event and tracking of parameters. The interface 300 may be rendered on a user computing device via the well logging operations analytics system 120. The interface 300 may provide or prompt a user for input. In some embodiments, information may be automatically populated.

In an exemplary embodiment, interface 300 may receive user input to initiate a login process at token 310. The login process may comprise a rights-based login, tiered-user login, or the like. Login may be verified by a remote server, via a multi-step authentication or the like. In an instance, the user may provide a password, user ID, or the like into a login window 320. Once logged in, a user may be allowed to complete actions based on permissions, which may be set by an administrative user.

A data control window 330 may load data for a job or event from stored or received information. The data may include drilling parameters, job parameters, or the like. It is noted that the data may be loaded from a memory component, may be provided through user input, or may be received from other sources (e.g., sensors, tools, third-party sources). Loaded data may be saved when loaded, in response to user input, or the like.

Visualization tools 340 may allow a user to select information to plot, display, or otherwise analyze. The visualization tools may, for instance, generate graphical plots to allow a user to review a job performance, or the like. A user may select a form or style of graph for display. It is noted that plots may be generated and displayed automatically, provided to administrators, or otherwise created.

Interface 300 may allow for identification of an event based on user input or on automatic event recognition as described herein. It is further noted that embodiments may allow a user to select events for classification from a taxonomy of events stored within a database. Moreover, users may be able to report incidents, provide narrative inputs, or the like Data related to events may be stored according to one or more file formats, taxonomies, or the like. In an example, a user may select a button 350 or token to initiate a save and generate output to database 116. It is noted that described systems and methods may save information automatically. In another aspect, information may be saved in formats that allow for comparative analysis, archiving, and the like.

Figure 4:
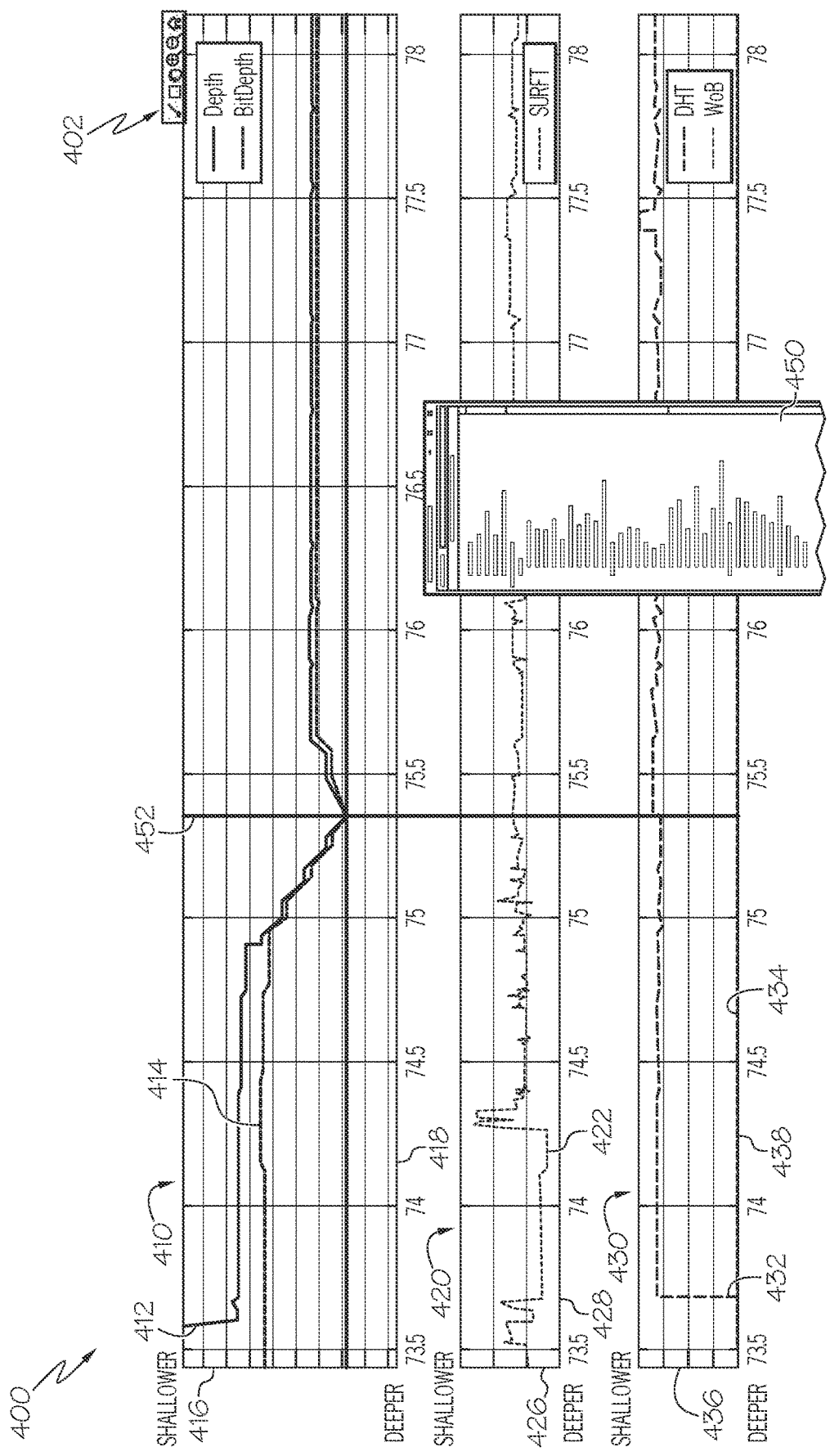
FIG. 4 graphically illustrates an example interface for log signature based graphical event picking, duplication, shifting, and deleting according to one or more embodiments described and illustrated herein.

Turning to FIG. 4, with reference to FIGS. 1-3, there is depicted an exemplary interface 400 for picking, duplicating, relocating or deleting events. In embodiments, well logging operations analytics system 120 may include instructions to render interface 400 and provide one or more graphical input/output tokens to a user. According to some embodiments, interface 400 may be provided within the interface 300, as a pop-up or part of main GUI window, on a display screen of a different computing device, or the like. For instance, information to be provided in interface 400 may be selected by data control window 330 and visualization tools 340 may identify visual preferences 352 (e.g., plot type, line type, granularity, event picking mode etc.) and data fields for plotting in interface 400. The interface 400 receives data loaded, for example, from the memory component 116, or otherwise received from well tools, computing devices, etc. It is noted that interface 400 may be displayed by a display screen of a computing device (e.g., input/output hardware 112 of control system 110).

In an example, data fields may include a depth 342, cable speed 344, surface tension 346, and cable head tension (e.g., downhole tension) 348. Selected data fields may be plotted according to the selections from the visual preferences 352 and an output selection 354, which may identify whether to output plots or curves in a single interface, on a single plot, on subplots, on different interfaces, or the like. Interface 400 may generate plots associated with selected data fields. As provided in the illustrated example, plot 410 illustrates the selected data field depth 342 (solid line 412) along with a bit depth (dashed line 414) with the y-axis 416 identifying depth in a unit of measurement and the x-axis 418 identifying a time. Plot 420 illustrates the selected data field surface tension 346 at line 422, which may identify surface tension in a unit of measurement on the y-axis 426 and the x-axis 428 identifying a time. Plot 430 illustrates the selected data field DH tension at line 432 and a weight of bit at line 434. Plot 430 identifies a unit and scale of measurement on the y-axis 436 and the x-axis 438 identifies time.

According to embodiments, the well logging operations analytics system 120 may allow for selection of different time-indexed data, a different number of plots, different data types, or the like for display by the interface 400. For instance, a user may select parameters to control the interface 400 through the data control window 330 and visualization tools 340. The acquisition data are processed upon loading using interpolation or decimation to a desired sampling rate, such as i samples/minute, where i is a number (e.g., 6, 60, etc.).

Interface 400 may additionally or alternatively display well directional data with selected data. In an example, the interface 400 may display bit depth, weight of bit, or other directional data. The directional data may be synchronized with the logging acquisition data and may be displayed when related data fields are selected for display by a user. In some embodiments, a user may enable or disable display of directional data.

In at least some embodiments, the well logging operations analytics system 120 may receive data for the interface from one or more data sources (e.g., databases, input files, etc.). For instance, memory component 116 may store a plurality of well logging files, may capture discrete parameters of well events. The well logging operations analytics system 120 may access the plurality of well logging files to identify data for plotting, merge identified data, and plot the identified data according to a desired output. It is further noted that the well logging operations analytics system 120 and application 208 may verify whether loaded data is correct based on determining whether files are corrupted, information is missing, information is faulty, or the like. In response to the determination, the well logging operations analytics system 120 may generate alters to a user, such as through interface 400, edit data, or the like.

The well logging operations analytics system 120 may allow a user to interact with the interface 400. For instance, a user may utilize the input/output hardware 112 to select graphical tools 402 and zoom, expand or compress time, adjust axes, and pick or review of job sequences or events. In response to picking an event, the well logging operations analytics system 120 may identify related fields stored in association with a selected event. The interface 400 may display the identified related fields with the selected event. For example, a user may select DH tension to plot at line 432. The well logging operations analytics system 120 may identify that a related field, e.g., weight of bit, is to be plotted with DH tension and may plot the weight of bit at line 434. It is noted that the well logging operations analytics system 120 may identify related fields based on predetermined relationships, inferring or deep learning based on a history of use, or the like.

According to embodiments, events may be identified based on user input or automatically (e.g., based on machine learning, artificial intelligence, etc.). In an example of event identification utilizing user input, the well logging operations analytics system 120 may allow for selection of points along one or more of plot 410, plot 420, and plot 430. Selection of a point on a plot may identify an event time (e.g., event start, event end, etc.). Based upon the selection, the well logging operations analytics system 120 may instruct the interface 400 to generate an event assignment interface 450. The event assignment interface 450 may comprise a graphical interface tool, such as a drop down window, a pop window, or the like. The graphical event picking and tracking application 208 may then receive user provided input selecting a desired event. It is noted that the graphical event picking and tracking application 208 may be a standalone application or may be part of the well logging operations analytics system 120. It is noted that the event assignment interface 450 may comprise a set or sets of events for selection. The events may be derived from a hierarchical taxonomy stored in memory component 116, and in the graphical event picking and tracking application 208. It is noted that the event assignment interface 450 may display some or all events within a hierarchical taxonomy. In some embodiments, there may be an option to place an "Undefined Event" and provide a brief event summary when activity type was not found in the reference tree. The "Undefined Events" may be reviewed, for example, by an administrator. If the "Undefined Events" is appropriately classified by an existing event, the administrator may set the event for the "Undefined Events" and a notification may be sent to an operator identifying why the "Undefined Events" should be classified in the existing event. In another example, the "Undefined Events" may be an event that is not available in the hierarchical taxonomy and a new event may be added for future operations use. For example, the well logging operations analytics system 120 may analyze information at the selected time and determine one or more events which may be available for selection. In an aspect, the determination may be based on calculating a probability that an event has occurred. If the probability exceeds a threshold, an event may be populated into the event assignment interface 450. The calculation may be determined based on a weighted model, deep learning, or the like.

As an example, a user may utilize a pointing device (e.g., input/output hardware 112 which may include a computer mouse, touch screen, stylus, etc.) to select a coordinate along the horizontal axes of one or more of plot 410, plot 420, and plot 430. A visual marker 452 may identify the selected coordinate. The visual marker 452 may be overlaid over on one or more of plot 410, plot 420, and plot 430. The event assignment interface 450 may be rendered. The user may select a desired event from the event assignment interface 450. In response to selection of the desired event, the graphical event picking and tracking application 208 derives an event parameter from information associated with the desired event. In embodiments, event assignment interface 450 may include a search utility where graphical event picking and tracking application 208 searches events for selectable events using keywords or word fragment. The search returns a list of selectable events including all the higher taxonomy levels in the same line. In another example, graphical event picking and tracking application 208 may identify whether the desired event is an incident (e.g., unplanned or unintended event) or not (e.g., a planned event). It is noted that an event may be placed, moved, relocated, deleted, or otherwise manipulated based on composite logs signatures. In data processing, after a job has been completed, this may reduce or completely negates the need for job witnessing. It may additionally serve as a reference sets creation tool to allow development of automated events recognition models. As described herein, the well logging operations analytics system 120 may utilize the desired event and event parameters to determine or suggest how the event is associated with a job, such as how an event may influence productivity, a schedule, or the like.

According to an embodiments, the graphical event picking and tracking application 208 may determine how the event relates to a particular run. A run may comprise a set of events in which a well tool (e.g., tools 142) is lowered into a borehole (e.g., borehole 104) and then retrieved from the borehole while recording measurements (e.g., well survey data 130). It is noted that a job may include one or more runs, and a run may include one or more events.

It is noted that events may be picked during or after an event is occurring or has occurred. Moreover, picking may be iterated to select one or more events from interface 400. The identified event, along with job parameters and related information, may be saved to memory component 116 and linked to a job in response to user input, automatically, or the like.

FIG. 5 depicts an exemplary interface 500 for summarizing identified events. Well logging operations analytics system 120 may include instructions to render interface 500 and provide one or more graphical input/output tokens to a user. According to some embodiments, interface 500 may be provided within the interface 300, as a pop-up window, on a display screen of a different computing device, or the like. It is noted that interface 500 may be displayed by a display screen of a computing device (e.g., input/output hardware 112 of control system 110).

Interface 500 may include an event table 510. The event table 510 may display one or more events (e.g., depicted as rows 512). Event table 510 may further display information associated with an event such as temporal data, job parameters (e.g., run number, etc.), drilling parameters, high resolution logging data, or the like. For example, event table 510 may render information associated with an event in columns, such as temporal data column 514, date column 516, drilling parameter column 518 (which may include one or more drilling parameters), an event column 520 (which may identify the event label selected from a hierarchical taxonomy) a remarks column 522 (which may include user provided remarks), an incident identification column 524 (which may identify whether an event is an incident), a display selection column 526 (which may allow a user to select whether to display an event), and a run number column 528 (which may identify the run in which an event occurred). It is noted that embodiments may render other or different information, such as tool string weight, maximum diameter, length, logging unit, cable, personnel performing and supervising the job, maximum temperature, mud properties, bit size, etc.

In at least some embodiments, graphical event picking and tracking application 208 may identify run numbers based on selected events from the hierarchal taxonomy. For example, the graphical event picking and tracking application 208 may identify the start of a run based on an event identifying that a rig has begun down logging, such as a "rig down logging string" event. The graphical event picking and tracking application 208 may likewise identify the end of a run based on an event identifying that a rig has begun up logging, such as a "rig up logging string" event. The well logging operations analytics system 120 may further identify events that occur outside of a run, such as events for conditioning a trip, testing, or the like.

It is further noted that interface 500 may allow a user to save event table 510 in various file formats, modify event table 510 (e.g., erase, hide, show, add events, etc.), or the like. For example, the interface 500 may provide an editing interface 512 as a pop-up window or otherwise. As depicted, the editing interface 512 may allow for editing of temporal data. It is noted that other fields may be edited. Interface 500 may identify a user who edits the event table 510 or otherwise access the event table 510. While described as a table, it is noted that embodiments may provide event table 510 as other or different visual representations.

Figure 6:
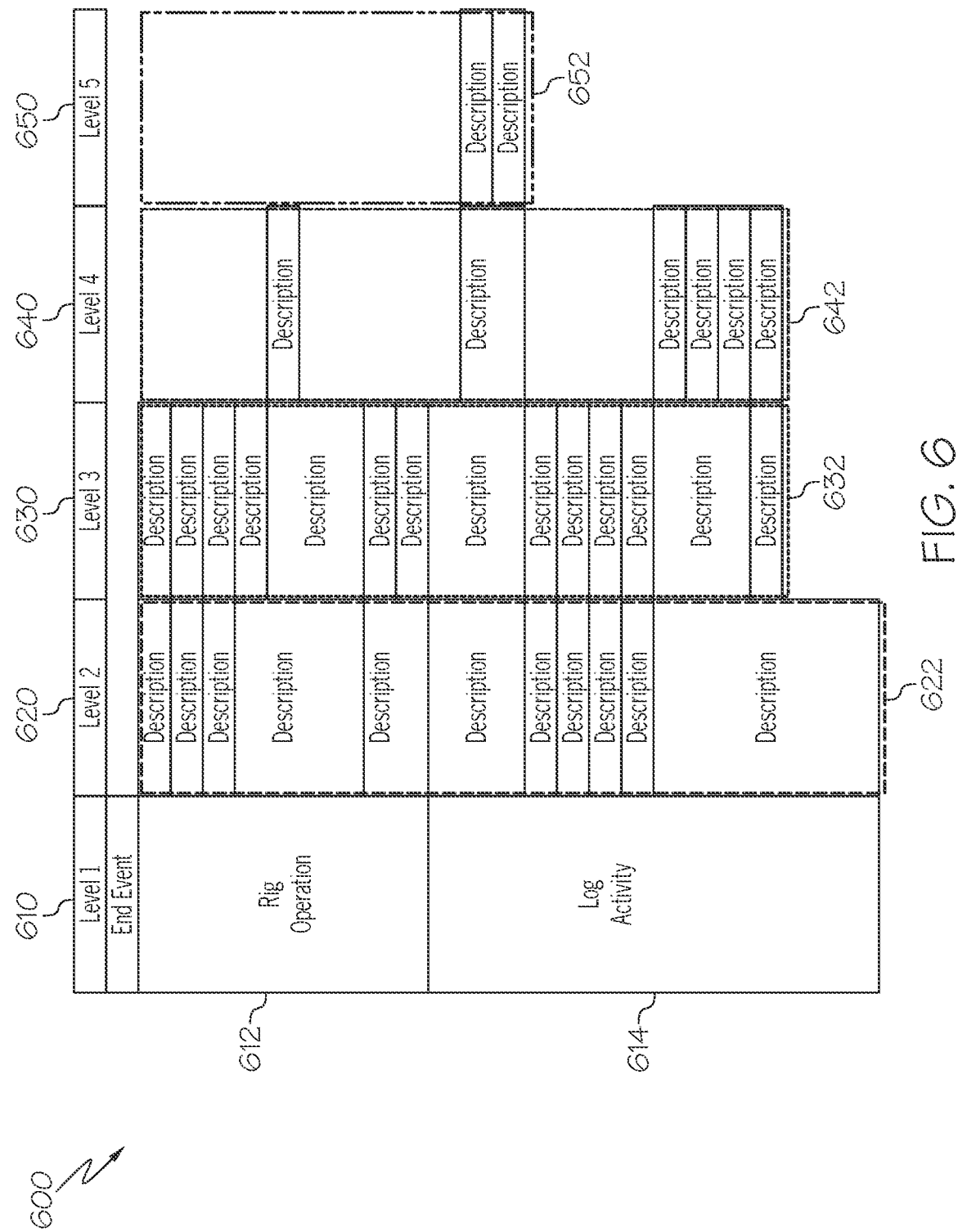
FIG. 6 graphically illustrates an example hierarchical taxonomy event identification according to one or more embodiments described and illustrated herein.

FIG. 6 depicts an exemplary hierarchical taxonomy 600 for event identification in accordance with described embodiments. Embodiments described herein may utilize the hierarchical taxonomy 600 to identify events, populate interfaces, or perform other actions. It is noted that the hierarchical taxonomy 600 may be modified according to a user's (e.g., organizations) preference, extensible, include other or different levels or nodes, etc.

In embodiments, hierarchical taxonomy 600 may include d levels, where d is a number. A level one node may identify distinct general event groups. Sublevel nodes identify more narrow events than their parent nodes. As an example, a parent node may identify "rig up" event and children nodes may identify particular events related to the "rig up."

In at least one embodiment, the hierarchical taxonomy 600 may include five levels (e.g., n=5), level one 610, level two 620, level three 630, level four 640, and level five 650. Level one 601 may include events classified into one or more broad nodes, such as a rig operation node 612 (e.g., a not logging activity), a log activity node 614, and an end event node 616. End event node 616 may not have any children and may be utilized to mark the start and duration of an event. Level two 620 may include second level nodes 622 that relate to general aspects of logging and rig operations, such as "undefined events", end of events, rig-up, rig-down, run in hole (RIH), depth log acquisition, pull out of hole (POOH), stationary events, unintended events, and others. In another example, unintended events may include job events which are not planned, but may occasionally occur. Unintended events may include events such as data transmission delays, tool stuck/fishing, equipment failure, abnormal situations, user error, or the like. Level three 630 may include third level nodes 632, level four 640 may include fourth level nodes 642, and level three 650 may include fifth level nodes 652. Level three 630, level four 640, and level five 650 may comprise operational sequences organized into sub-events or sub-activities. In embodiments, terminal nodes (e.g., those without children) may be selectable for identification or picking of an event. This may allow well logging operations analytics system 120 to aggregate data and summary reports. For example, events of normal and high tension during the depth logging can be selected from terminal nodes, however their parent events, such as "Acquiring Depth" is not selectable (such as via assignment interface 450 of FIG. 4). Reports or summaries for depth log interval, duration and speed can be generated for an entire well log (or other types of operations). In other embodiments, any node maybe selectable.

In at least one exemplary embodiment, level two nodes for the rig operation node 612 may include the following children nodes:
Arrived on location
Left location
Job Start—Rig assigned to Service Company
Tool Checks
Surface gear preparation
Stand-by before the job
Stand-by after the job
Conditioning Trip, which may include the following third level nodes 632:
Bit At Surface
Circulation
Not Listed
POOH
RIH
Tension Event, which may include the following fourth level node 642 child node: High tension or compression event
Circulation trip with tools in hole
Circulation (with tools in hole)
Drilling
Rig BOP test
Rig Maintenance
End of Job Safety Briefing
Other rig activity
Job End—Rig returned to Drilling In an embodiment, level two nodes for the log node 614 may include the following children nodes:
Rig up, which may include the following third level nodes 632:
RUN Safety Briefing
Rig up WL gear
Rig up WL BOP
Rig up logging string
Rig up WMC
Tools Operational Checks
Load RA sources
Rig up Side-Entry Sub
Make up Side-Entry Sub
Latching Operations
Prepare for Pipe Conveyed Logging
Wireline BOP (Connect/Disconnect, Rig Up)
Rig up perforation string/gun
Rig up mechanical srvc string
Tool Zero
Run In Hole ("RIH"), which may include the following third level nodes 632
Tractor downhole
RIH in Casing
RIH in OpenHole
RIH between logging/correlation passes
RIH for latching
Down log
Tag TD
Tension check in casing
Tension Check in open hole
WMC activation
First RIH Procedure Checks
Switch Tractor to Log
Tension Event, which may include the following fourth level nodes 642
Tension Check (RIH, Logging)
High Tension/Compression (RIH, Logging)
Temperature Stabilization (FTS or other)
Pressure Flow Check
Tools Deployment
Downhole Tool Checks, which may include the following third level nodes 632:
Tools check in OH (stationary)
Tools check in OH (moving)
Tools check in CH (RIH)
Tool check in CH (other)
Acquiring Depth Log, which may include the following third level nodes 632:
Correlating between stations
Correlation Pass
Main Pass
Relog
Relog due to poor Data Quality
Repeat Pass
Tension Event, which may include the following fourth level nodes 642:
Normal Tension (Logging)
High Tension Event while Logging
Pressure Pass
Depth Match Verification (stationary)
Rig operations, which may include the following third level nodes
Pressurize Wellbore
Pull Out of Hole ("POOH"), which may include the following third level nodes 632:
POOH with tools POOH between logging/correlation passes
POOH while waiting for confirmation (by Logger) to rig down
POOH while waiting for confirmation (by Operator) to rig down
POOH while recomputing logs (data not sent)
POOH while recomputing logs (data already sent)
POOH cable after unlatching
POOH after Over-pull
Transmitting data while POOH
Tool Casing Checks (POOH) Tension Event, which may include the following fourth level nodes 642:
  Normal Tension (POOH)
  High Tension Event while POOH
Data Transmission/Processing, which may include the following third level nodes 632:
  Transmitting data while stationary
  Processing data while stationary
Rig down, which may include the following third level nodes 632:
  Safety briefing
  Unload RA sources
  Tool Zero Check (rig down)
  Rig down logging string
  Rig down WL gear
  Rig down WL BOP
  Rig Down WMC
  Unlatching Operations
  Rig down Side-Entry Sub
  SWC recovery confirmation
  FTS samples recovery confirmation
  Prepare for next logging run
  Wireline BOP (Disconnect/Connect, Rig Down)
  Rig down perforation string/gun
  Rig down mechanical services string
Fishing, which may include the following third level nodes 632:
  Waiting for Instructions (fishing)
  Fishing preparation
  Pre-Fishing safety briefing
  Fishing Gear Rig Up
  RIH for fishing
  Circulation (fishing)
  Engage Fish
  Breaking Weak Point
  POOH with Fish
  Fishing Gear Rig Down
  Tool Recovery (fishing)
  POOH with cable (fishing)
  Other
Logging While Fishing, which may include the following third level nodes 632:
FTS station, which may include the following third level nodes 632:
  Start of FTS Pretest Sequence
  End of FTS Pretest Sequence
  FTS pretest
  Pretest (when scanning for sampling/DFA)
  Pretest (during sampling/DFA station)
  Inflation of packers
  Deflation of packers
  Cleanup (sampling)
  Cleanup (DFA)
  Capture Sample
  Buildup
  Extended interval testing
  Mini-frac
  Super-flow
  VIT
  Stick test (before sampling)
  Stick test (before pretest)
  Stick test (before FTS other)
  FTS Samples Recovery (tank draining/confirmation)
Tripping between stations, which may include the following third level nodes 632:
  Tripping between stations
  Tension Event, which may include the following fourth level nodes 642:
    Normal Tension Pick (between stations)
    High Tension after Stationary Event
    High Tension while tripping between stations
Station Log or SWC, which may include the following third level nodes 632:
  VSP station
  Check-shot while RIH/other
  Wait on Vibro-truck move/ready
  SWC station
  Start of SWC (Sidewall Coring) Sequence
  End of SWC (Sidewall Coring) Sequence
  NMR station
Cooling tools, which may include the following third level nodes 632:
  POOH to cool toolstring
  RIH after cooling toolstring
Perforation, which may include the following third level nodes 632:
  Run into position (perforation)
  Perforate
Back-off Operations, which may include the following third level node 632:
  Back-off Operations
Mechanical Services, which may include the following third level nodes 632:
  Perform Mechanical services (stationary)
  Perform Mechanical services (moving)
Unintended Events, which may include the following third level nodes 632:
  Fix cable spooling
  Unlatching
  Troubleshooting downhole
  Restarting acquisition system
  Troubleshooting at surface
  Surface Equipment failure
  POOH due to failure
  POOH (due to held up or overpull)
  Held Up event
  Changing logging string/tool
  Run in Hole after failure fixed
  Waiting for Equipment
  Waiting for Personnel
  Waiting for further instructions ("WFI"), which may include the following fourth level nodes 642:
    WFI to POOH, which may include the following fifth level nodes 652:
      Logs review in town (WFI to POOH by Logger)
      Logs review in town (WFI to POOH by Admin)
      WFI to POOH after FTS pretests
      WFI to POOH after FTS sampling
      WFI to re-run SWC (after reporting recovery)
      WFI to Rig down, which may include the following fifth level node 652:
        Logs review in town (WFI to Rig Down by Logger)
        Logs review in town (WFI to Rig Down by Admin)

WFI to Re-log, which may include the following fifth level node 652:
Logs review in town (WFI to relog by User)
Logs review in town (WFI to relog by Admin)
Data Transmission delay, which may include the following fourth level nodes 642:
IT
Hardware
Software/Configuration
Logs Reprocessing
Tool stuck, which may include the following fourth level nodes 642:
Attempting to pull tool free
Stuck tool pull free
Broke weak point (unintentionally)
Broke or released weak point (intended)
Cable damage during stuck event
High Tension while Depth Logging
High Tension, other
High Tension after Stationary Event
Jar Activation
Tool Broke/Parted
Cable damage, which may include the following fourth level nodes 642:
Cable damage at surface
Cable damage downhole
Waiting on Rig (DE/Foreman)
Rig Eqpt Failure
Other Rig Incident It is noted that the node descriptions may vary in other embodiments. Moreover, while illustrated as a hierarchical tree, the hierarchical taxonomy 600 may be hierarchically organized in other structures to facility picking or identification of events.

Figure 7:
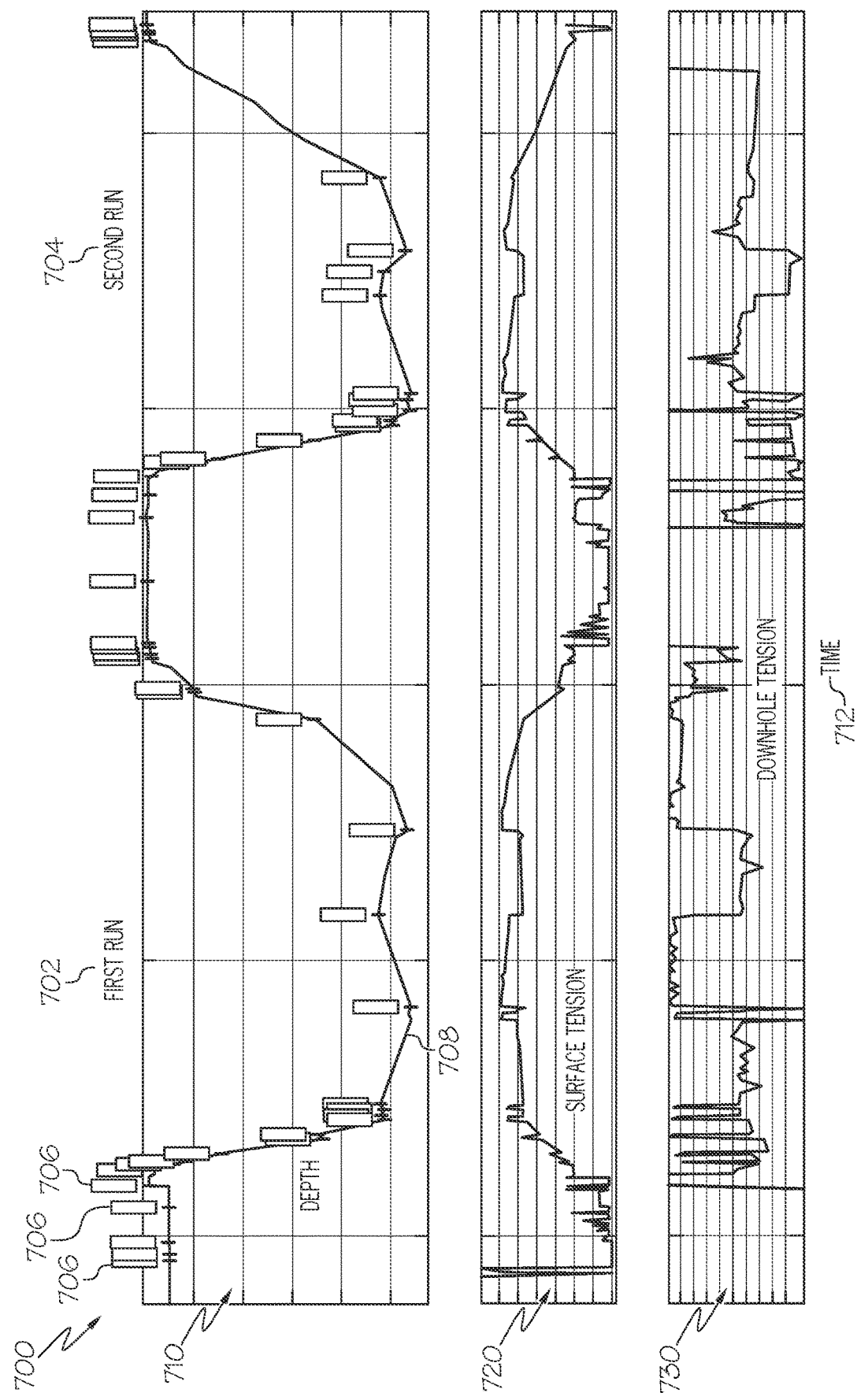
FIG. 7 graphically illustrates an example interface for plotting identified logging sequence events according to one or more embodiments described and illustrated herein.

FIG. 7 depicts an interface 700 that may plot identified events during logging runs according to disclosed embodiments. It is noted that any number of runs, partial runs, or the like may be rendered. It is further noted that interface 700 may include plots of desired information, which may be provided via individual plots or one or more aggregate plots. Using the historical data in well logging operations analytics system 120, graphical event picking and tracking application 208 may render interface 700 providing one or more graphical input/output tokens to a user. According to some embodiments, interface 700 may be provided within the interface 300, as a pop-up window, on a display screen of a different computing device, or the like. It is noted that interface 700 may be displayed by a display screen of a computing device (e.g., input/output hardware 112 of control system 110).

Interface 700 may include a plot 710 illustrating a depth on a y-axis, a plot 720 illustrating surface tension on the y-axis, and a plot 730 illustrating downhole tension on a y-axis. The x-axis 712 may identify time. Events may be identified by tokens 706 (e.g., labels, flags, callouts, etc.) on a line 708. A first run 702 and a second run 704 may be viewable based on one or more of plot 710, plot 720, or plot 730.

Tokens 706 may include flags, markers, color coded tokens, or the like. The tokens 706 may be provided on one or more of plot 710, plot 720, or plot 730. In another aspect, tokens 706 may include a character string identifying the plot. In some embodiments, the tokens 706 may be selectable, expandable, resizable (e.g., minimized, maximized), hide-/unhide-able, or the like).

Figure 8:
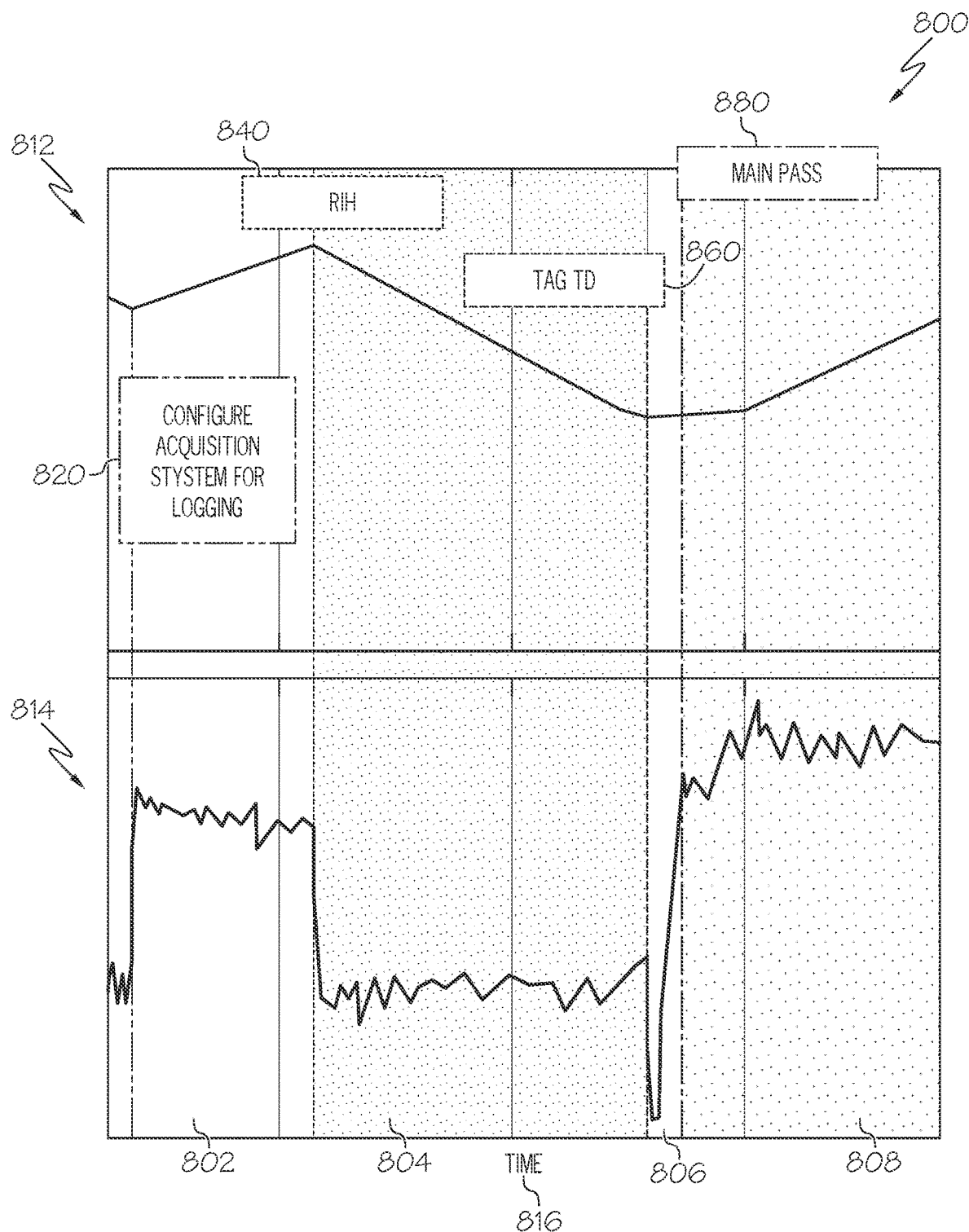
FIG. 8 graphically illustrates an example interface for logs pattern based event identification or recognition of downhole events according to one or more embodiments described and illustrated herein.

FIG. 8 depicts an interface 800 that may allow for more detailed event identification or recognition of downhole events, according to disclosed embodiments. In an aspect, the graphical event picking and tracking application 208 may include instructions to render interface 800 and provide one or more graphical input/output tokens to a user. According to some embodiments, interface 800 may be provided within the interface 300, as a pop-up window, on a display screen of a different computing device, or the like. It is noted that interface 800 may be displayed by a display screen of a computing device (e.g., input/output hardware 112 of control system 110).

Interface 800 depicts exemplary event 820 (which may include an "Configure Acquisition System for Logging" event), event 840 (which may comprise an RIH event), event 860 (which may comprise a "Tag TD" event), and event 880 (which may comprise a "Main Pass" event), respectively associated with periods $t_1$ 802, $t_2$ 804, $t_3$ 806, and $t_4$ 807 on plot 812, which may illustrate depth, and plot 814, which may illustrate tension, with an x-axis 816 identifying time. The periods $t_1$ 802, $t_2$ 804, $t_3$ 806, and $t_4$ 807 may be identified from log signatures (e.g., received data, job data, etc.), and events assigned by a user or detected by automated events recognition application 210 utilizing machine learning, deep learning, or the like.

Figure 9:
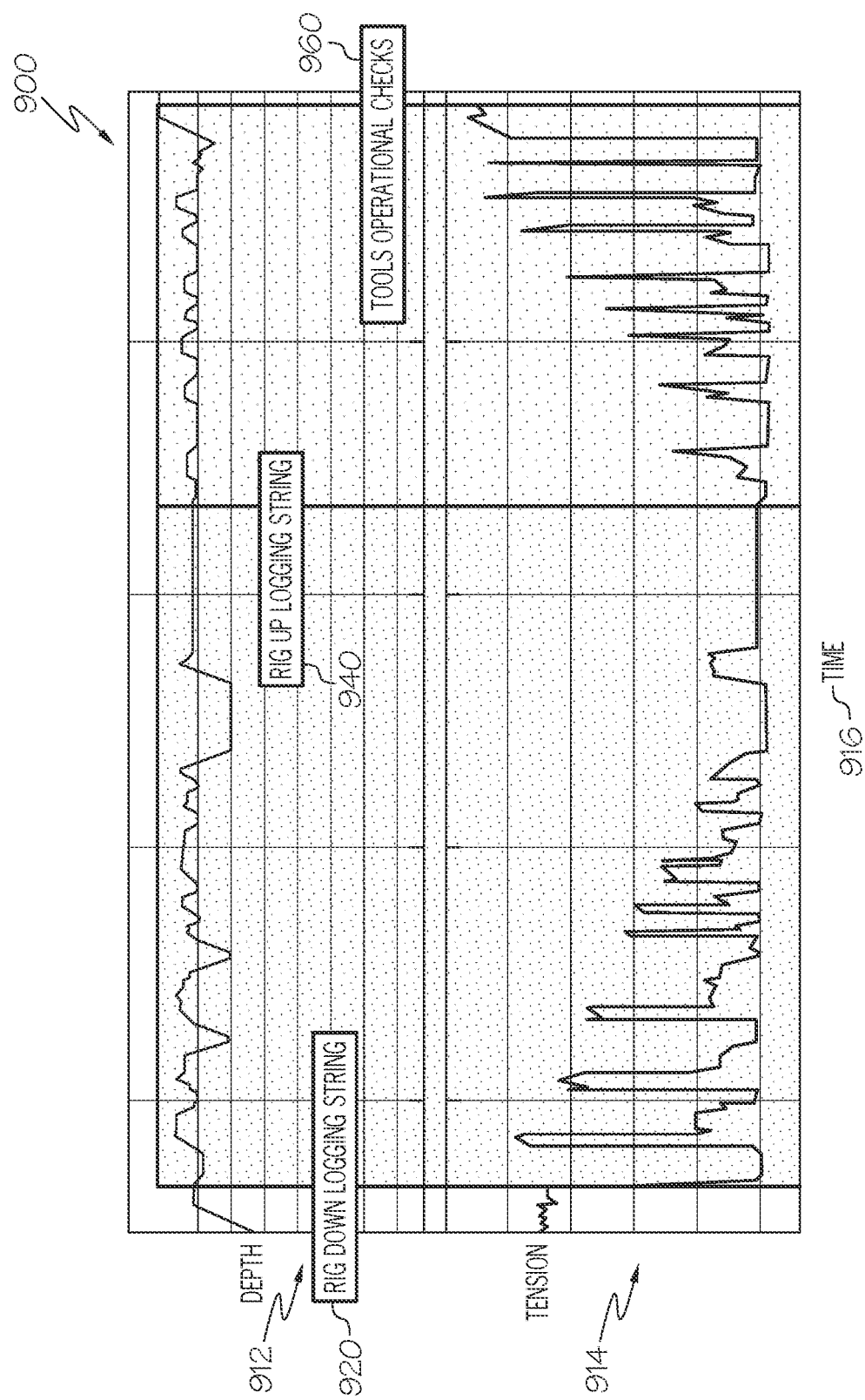
FIG. 9 graphically illustrates an example interface for event identification or recognition of surface events according to one or more embodiments described and illustrated herein.

FIG. 9 depicts an interface 900 that may allow for event identification or recognition of surface events, according to disclosed embodiments. In an aspect, graphical event picking and tracking application 208 may include instructions to render interface 900 and provide one or more graphical input/output tokens to a user. According to some embodiments, interface 900 may be provided within the interface 300, as a pop-up window, on a display screen of a different computing device, or the like. It is noted that interface 900 may be displayed by a display screen of a computing device (e.g., input/output hardware 112 of control system 110).

Interface 900 may depict one or more of event 920 (which may include a "rig down logging string" event), event 940 (which may include a "Rig up logging string" event), or event 960 (which may include a "tools operation checks" event). The events 920, 940, and 960 may be identified on one or more of plot 912 (which may illustrate depth) or plot 914 (which may illustrate tension), with an x-axis 916 identifying time. Graphical event picking and tracking application 208 may identify times or time periods from log signatures, and events may be identified from log signatures (e.g., received data, job data, etc.), and events assigned by a user or detected by well logging operations analytics system 120 utilizing machine learning, deep learning, or the like. For instance, the gradual decrease and increase in tension during event 920 and event 940 may correspond to a logging head that was used to lift and lower an individual piece and then a whole string. Such details will not be available if the rig tugger line (also known as "catline") had been used instead. Therefore, a user may record and identify the event from a hierarchical taxonomy.

Figure 10:
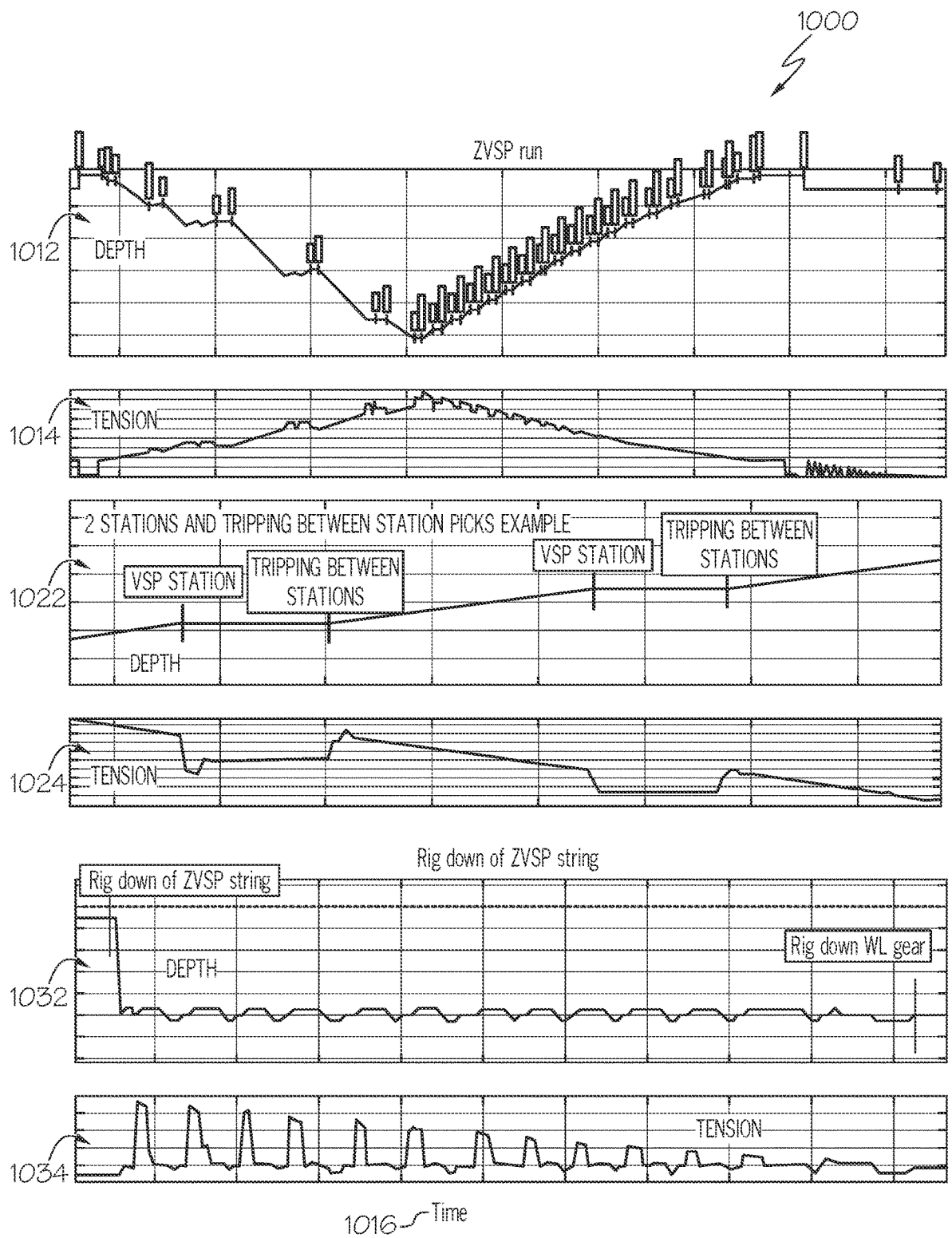
FIG. 10 graphically illustrates an example interface for event identification or recognition of events utilizing Zero Offset Vertical Seismic Profiling according to one or more embodiments described and illustrated herein.

FIG. 10 depicts an interface 1000 that may allow for event identification or recognition of events utilizing Zero Offset Vertical Seismic Profiling (ZVSP), according to disclosed embodiments. In an aspect, graphical event picking and tracking application 208 may include instructions to render interface 1000 and provide one or more graphical input/output tokens to a user. According to some embodiments, interface 1000 may be provided within the interface 300, as a pop-up window, on a display screen of a different computing device, or the like. It is noted that interface 1000 may be displayed by a display screen of a computing device (e.g., input/output hardware 112 of control system 110). Interface 1000 depicts plot 1012 (which may illustrate depth on a top track and tension on a bottom track 1014), plot 1022 (which may illustrate depth on top track, and tension on a bottom track 1024), plot 1032 (which may illustrate depth on a top track and tension on a bottom track (034), and an x-axis 1016 identifying time. Plot 1012 may illustrate a complete run. Plot 1022 may illustrate an enlarged view of over a two stations interval. Plot 1032 and plot 1034 may illustrate a plurality of data related to logging tools and wireline gear rig-down. In some embodiments, graphical event picking and tracking application 208 may deduce a number of tool joint connections or other information from the tension and depth curves patterns, such on based on a history of data, deep learning, machine learning, or the like.

Figure 11:
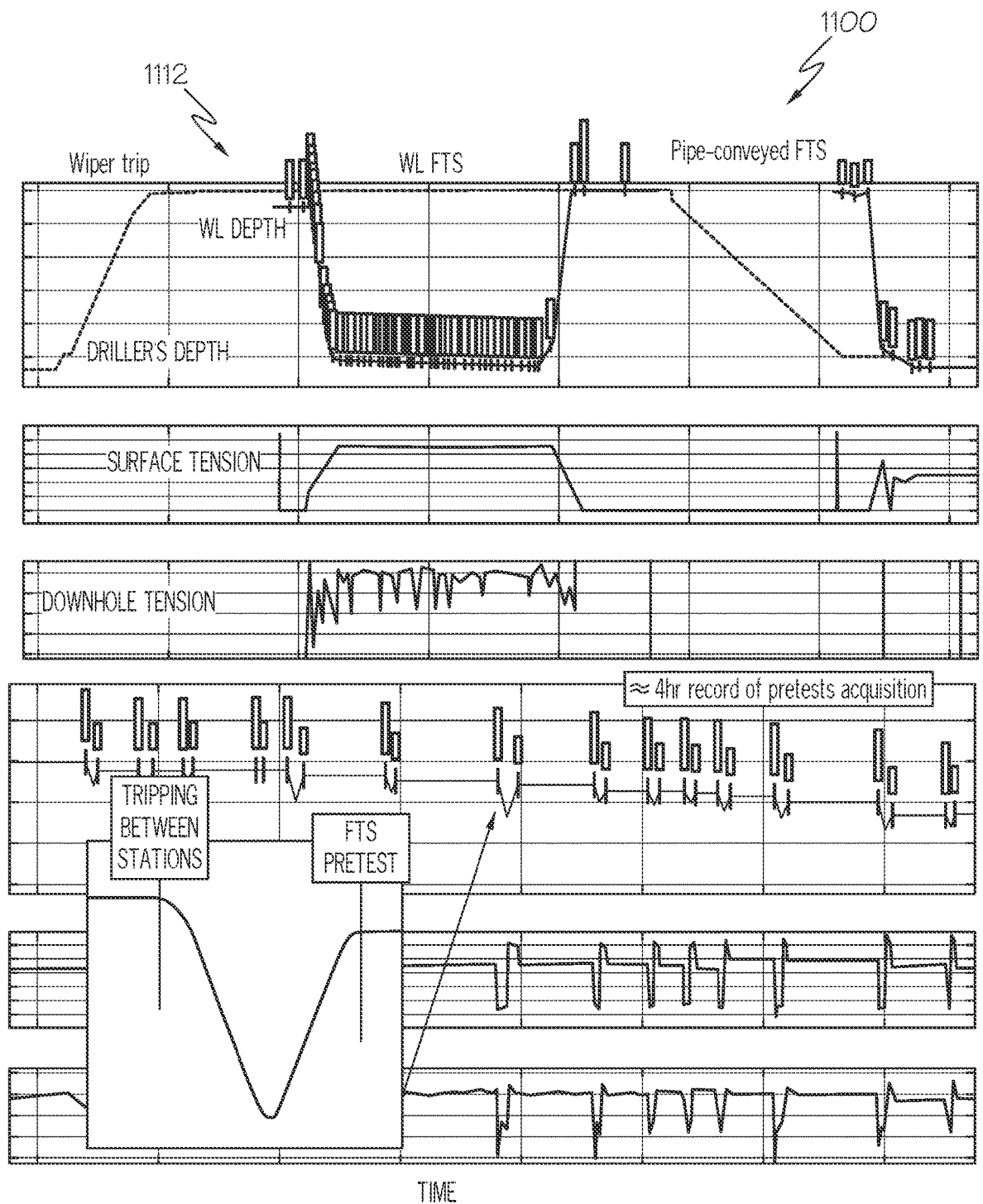
FIG. 11 graphically illustrates an example interface for event identification or recognition of events based on analysis of data according to one or more embodiments described and illustrated herein.

FIG. 11 depicts an interface 1100 that may allow for event identification or recognition of events based on analysis of data, according to disclosed embodiments. In an aspect, well logging operations analytics system 120 may include instructions to render interface 1100 and provide one or more graphical input/output tokens to a user. According to some embodiments, interface 1100 may be provided within the interface 300, as a pop-up window, on a display screen of a different computing device, or the like. It is noted that interface 1100 may be displayed by a display screen of a computing device (e.g., input/output hardware 112 of control system 110).

Interface 1100 depicts plots 1112 with various identified events related to a borehole condition trip events, acquisition of wireline pretests events, and start of a pipe-conveyed formation tester services (FTS) descent events. In examples, events may be identifiable from log patterns. In an aspect, some events or data may be entered with reference to each FTS station record, such as individual sampling stationary events, such as operating packers, performing clean-up and sampling. According to some embodiments, graphical event picking and tracking application 208 may include analytical tools to identify events based on recorded curves graphical event picking and tracking application 208, or otherwise stored in memory. For instance, graphical event picking and tracking application 208 may be automated events recognition 210 and may analyze a portion of a curve 1120 (shown enlarged), to identify events based on comparing curvature, temporal data, or other data to historical information.

In some embodiments, the well logging operations analytics system 120 utilizes artificial intelligence, statistical models, or other processes and/or algorithms. For instance, classifiers may be mapped to an attribute vector to a confidence that the attribute belongs to a class. An input attribute vector, x=(x1, x2, x3, x4, xn) may be mapped to f(x) =confidence(class). Such classification can employ a probabilistic and/or statistical based analysis to infer a probability of a priority. The well logging operations analytics system 120 may determine whether to assign an event to a particular event of a hierarchical taxonomy based on the probability exceeding a probability threshold (e.g., a percentage, a number of tokens out of possible tokens, etc.). In various embodiments, the well logging operations analytics system 120 may utilize other directed and undirected model classification approaches including, e.g., naïve Bayes, Bayesian networks, decision trees, neural networks, fuzzy logic models, and probabilistic classification models providing different patterns of independence. Classification may also include statistical regression that graphical event picking and tracking application 208 may utilize to develop models of identification of events.

Figure 12A:
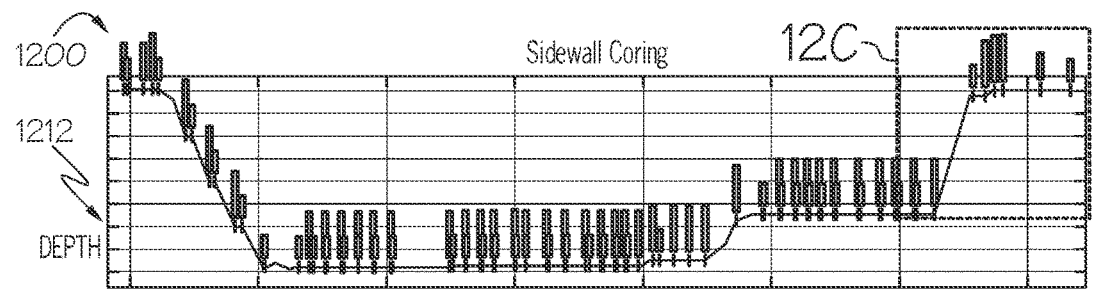
FIGS. 12A, 12B, and 12C graphically illustrate an example interface for event identification or recognition of events for a sidewall coring wireline run according to one or more embodiments described and illustrated herein.
Figure 12B:
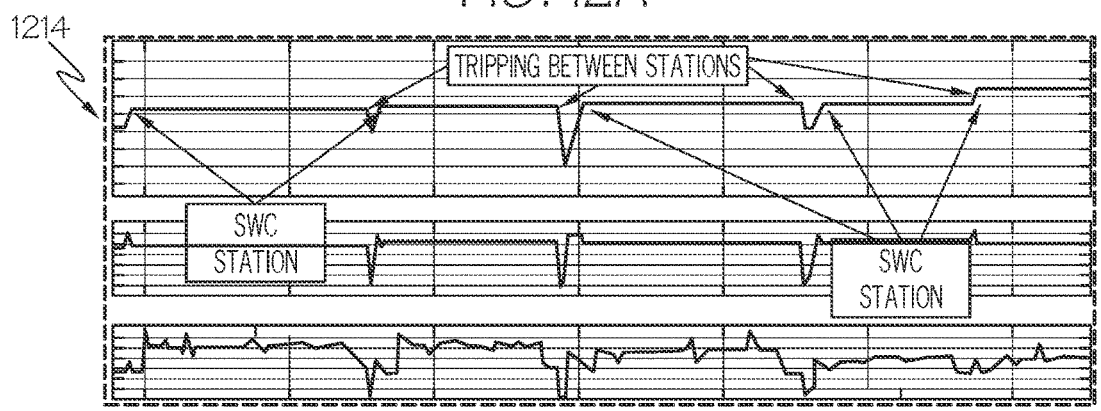
Figure 12C:
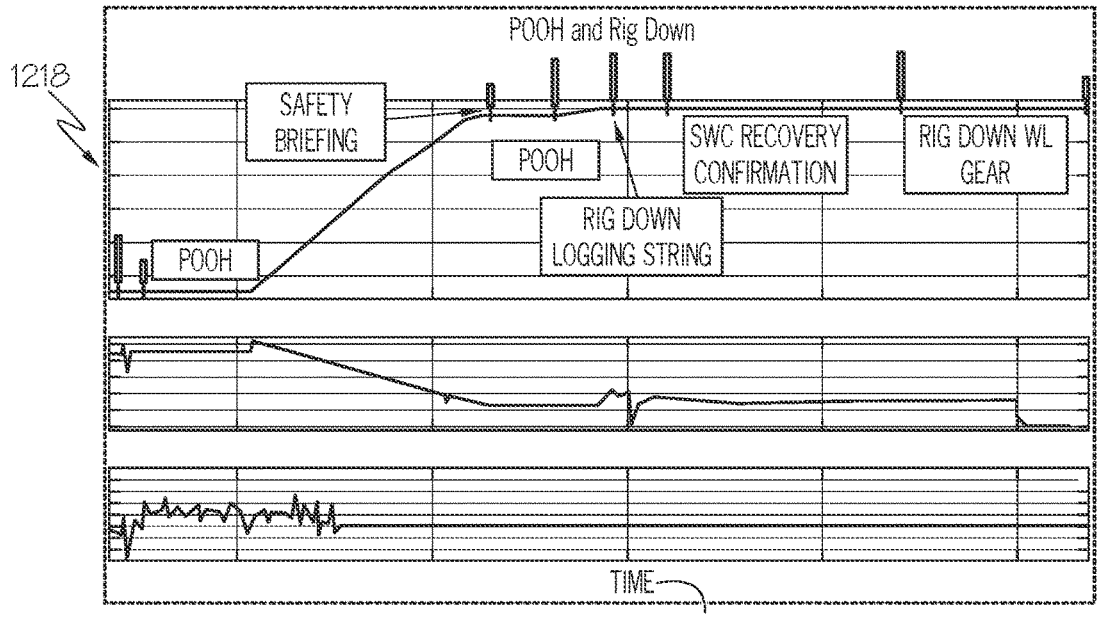

FIGS. 12A, 12B, and 12C depict an interface 1200 that may allow for event identification or recognition of events for a sidewall coring wireline run, according to disclosed embodiments. In an aspect, graphical event picking and tracking application 208 may include instructions to render interface 1200 and provide one or more graphical input/output tokens to a user. According to some embodiments, interface 1200 may be provided within the interface 300, as a pop-up window, on a display screen of a different computing device, or the like. It is noted that interface 1200 may be displayed by a display screen of a computing device (e.g., input/output hardware 112 of control system 110).

Plot 1212 depicts a sequence of sidewall coring operations including rig-up, running in hole (RIH), coring, pulling out of hole (POOH), rig-down and recovery confirmation. Plot 1214 depicts a typical pattern of depth and tension curves used to identify start of coring and trips between sidewall coring stations. Plot 1218 illustrates POOH and surface events, which may require the logging engineer to confirm the occurrences and timing, and an x-axis 1216 identifying time.

Figure 13:
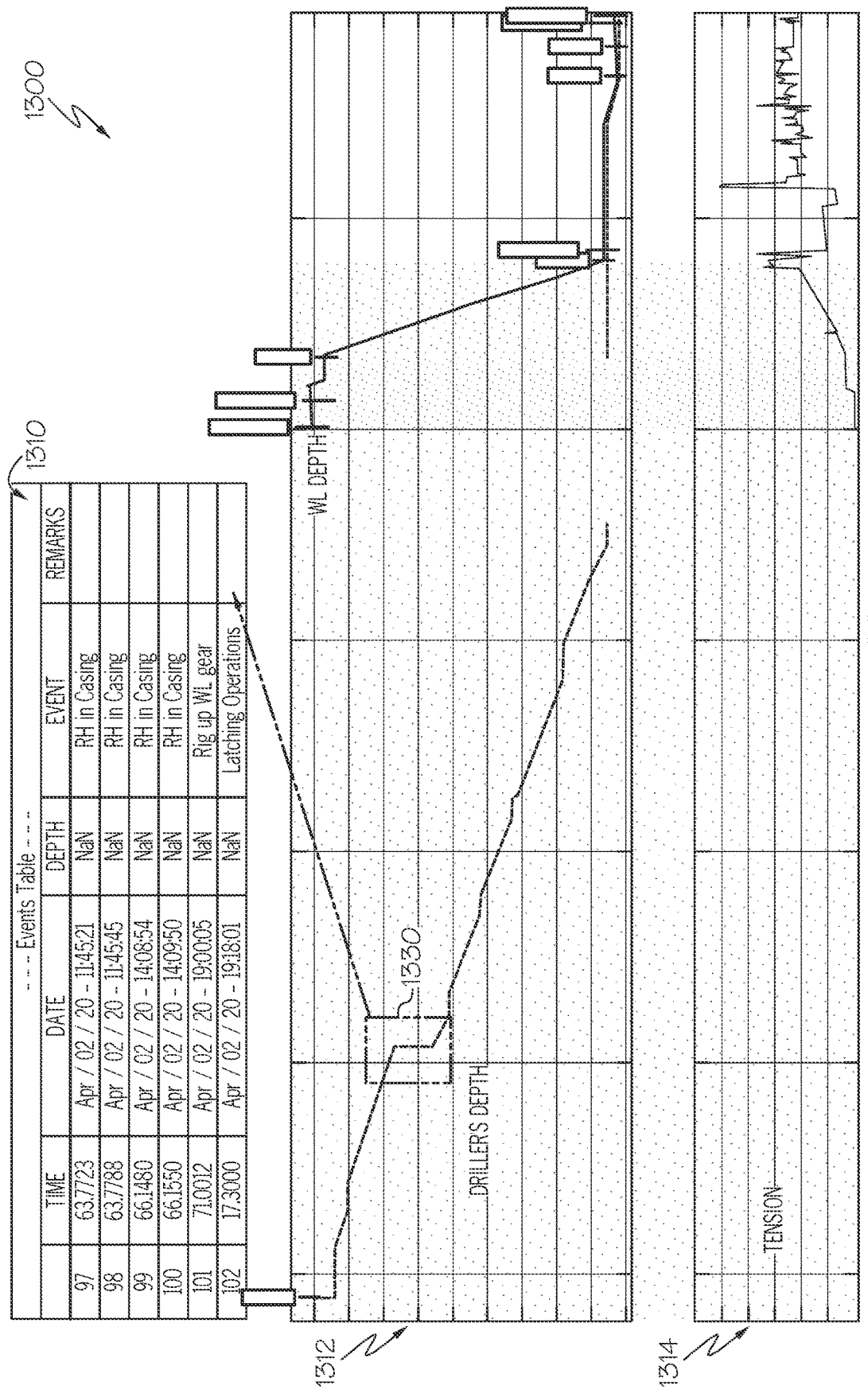
FIG. 13 graphically illustrates an example interface for event identification or recognition of events for a start of pipe conveyed FTS logging operations according to one or more embodiments described and illustrated herein.

FIG. 13 depicts an interface 1300 that may allow for event identification or recognition of events for a start of pipe conveyed in FTS descent logging operations, according to disclosed embodiments. In an aspect, well logging operations analytics system 120 may include instructions to render interface 1300 and provide one or more graphical input/output tokens to a user. According to some embodiments, interface 1300 may be provided within the interface 300, as a pop-up window, on a display screen of a different computing device, or the like. It is noted that interface 1300 may be displayed by a display screen of a computing device (e.g., input/output hardware 112 of control system 110).

Track 1312 depicts driller's depth with an x-axis 1316 identifying time. Track 1314 depicts tension. In an example, events identified during the start of pipe conveyed logging operations may include running in hole (RIH) in casing, RIH in casing (which may be identified one or more times to reflect the change in RIH speed), safety briefing, rig-up side-entry sub, RIH for latching, latching operations, tool checks in casing (RIH), correlation pass and an FTS pretests sequence. Events such as RIH in casing, RIH for latching, latching operations, tool checks, correlation pass and FTS pretests may be identified from the log signatures. Automated event recognition application 210 may identify, based on log signatures, events and precise timings for rig-up of side-entry sub, running in hole etc. Knowledge of job facts may need to be utilized for accurate reporting when logs signature are not representative for specific events picking.

Figure 14:
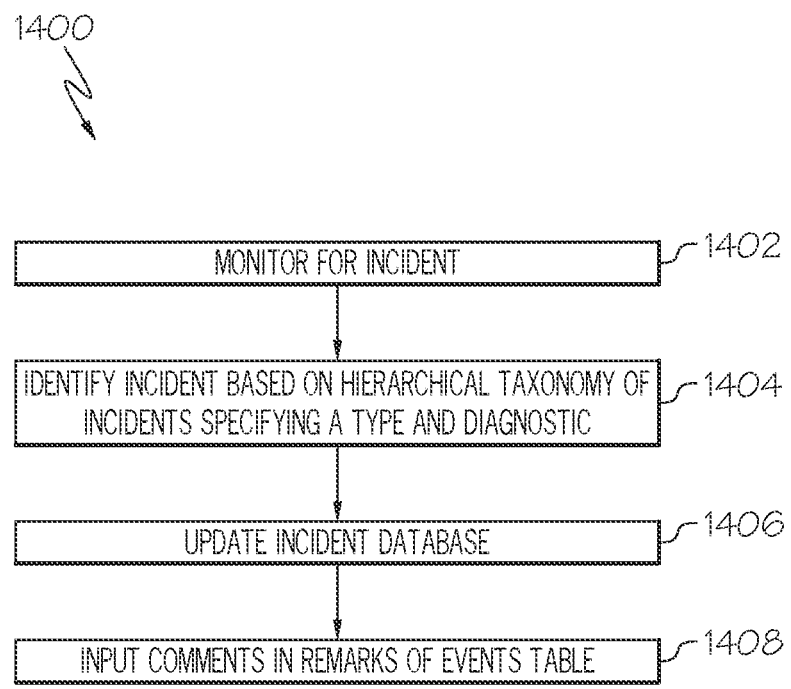
FIG. 14 graphically illustrates an exemplary flowchart of non-limiting method associated with systems and methods for identifying incidents in well operations according to one or more embodiments described and illustrated herein.

In an example, a user or automated event recognition application 210 may identify anomalies, such as a sudden change in speed at period 1330. Graphical event picking and tracking application 208 may prompt or otherwise allow a user to identify a reason for the anomaly. For instance, a user may provide an explanation in an events table 1310. In some embodiments, graphical event picking and tracking application 208 may identify or infer a reason for the anomaly based on a weighted model that determines probabilities for potential causes, which may utilize deep learning, regression analysis, or the like. FIG. 14 depicts an exemplary flowchart of non-limiting method 1400 associated with systems and methods for identifying incidents in well operations, according to various aspects of the subject disclosure. As an example, method 1400 may identify, classify and diagnose an incident. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

At 1402, a system (e.g., system 100 utilizing processor 114 executing well logging operations analytics system 120) may monitor for incidents or abnormalities related to well operations via incidents detection algorithms as described herein. In embodiments, monitoring may include receiving data from one or more sources before, during, or after well operations. In another aspect, monitoring may include identifying user input which may indicate an incident occurred at a selected period. According to some embodiments, monitoring may comprise comparison of data to models, historical data, or the like to identify animalize or patterns indicating an incident or anomaly (positive or negative) has occurred. For instance, the system 100 may determine the length of time to complete an event, between an event, or the like deviates a threshold amount from an expected or predicted time. It is noted that the system 100 may apply a weighted model, deep learning, or the like.

At 1404, the system may identify an incident based on a hierarchical taxonomy of incidents specifying a type of incident (e.g., classification) and diagnostic. As described herein, the incident type and diagnostic (e.g., reason for incident) may be identified based on user input or without user input (e.g., based on automated recognition of an incident.

At 1406, the system may update an incident database. Updating an incident database may include adding, modifying, or otherwise providing incident information to a storage device. In some examples, an incident may be reported to an administrator or the like.

At 1408, the system may input comments in remarks of events table. The remarks may be input based on a user input, automated input (e.g., based on modeling, etc.).

Figure 15:
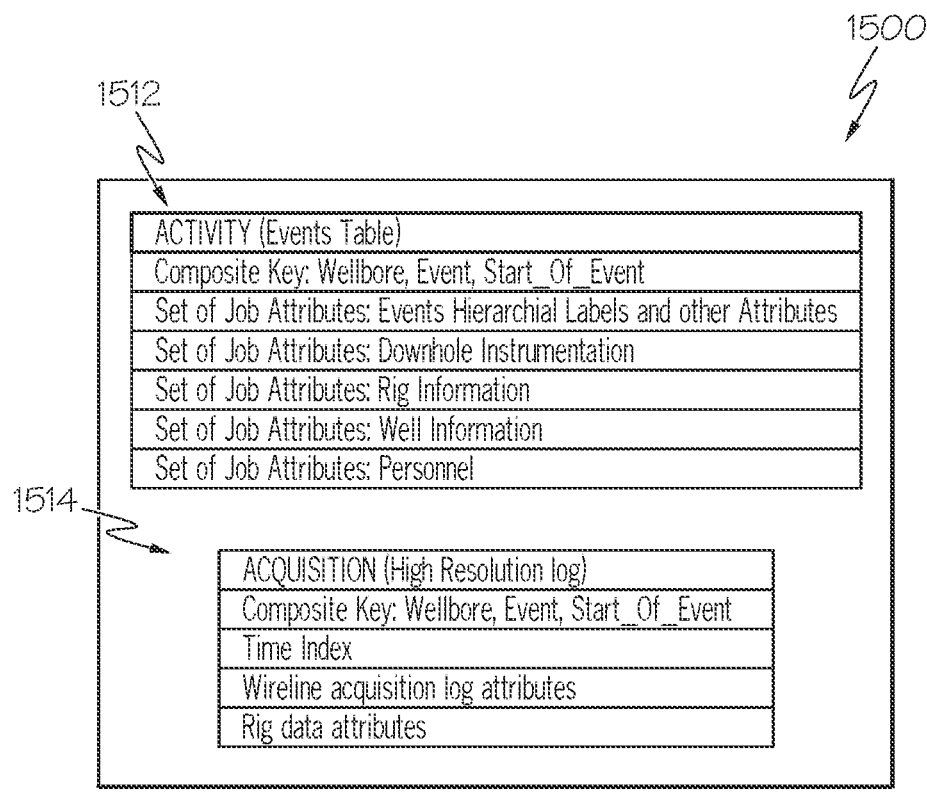
FIG. 15 graphically illustrates an example interface depicting contents of an output file related to identifying of events and well logging of a job according to one or more embodiments described and illustrated herein.

FIG. 15 depicts an interface 1500 that may include contents of an output file related to identifying of events and well logging of a job, according to disclosed embodiments. In an aspect, well logging operations analytics system 120 and/or graphical event picking and tracking application 208 may include instructions to render interface 1500 and provide one or more graphical input/output tokens to a user. According to some embodiments, interface 1500 may be provided within the interface 300, as a pop-up window, on a display screen of a different computing device, or the like. It is noted that interface 1500 may be displayed by a display screen of a computing device (e.g., input/output hardware 112 of control system 110).

In embodiments, and output file may include one or more entities, such as a high-resolution acquisition file 1512, which may be output at a desired sampling rate (e.g. 1 second), and an events table file 1514. The acquisition file 1512 may include merged, synchronized log acquisition and drilling parameters, time log data, composite key of attributes (wellbore name, event name, start of event date and time), and the like. The events table file 1514 may include attributes related to a group of factors, such as event name, events tree levels, times, duration of every event; downhole instrumentation; rig information; well information; and personnel attributes. The output file may be provided in desired application formats, may be saved, shared, archived, or otherwise utilized.

Figure 16:
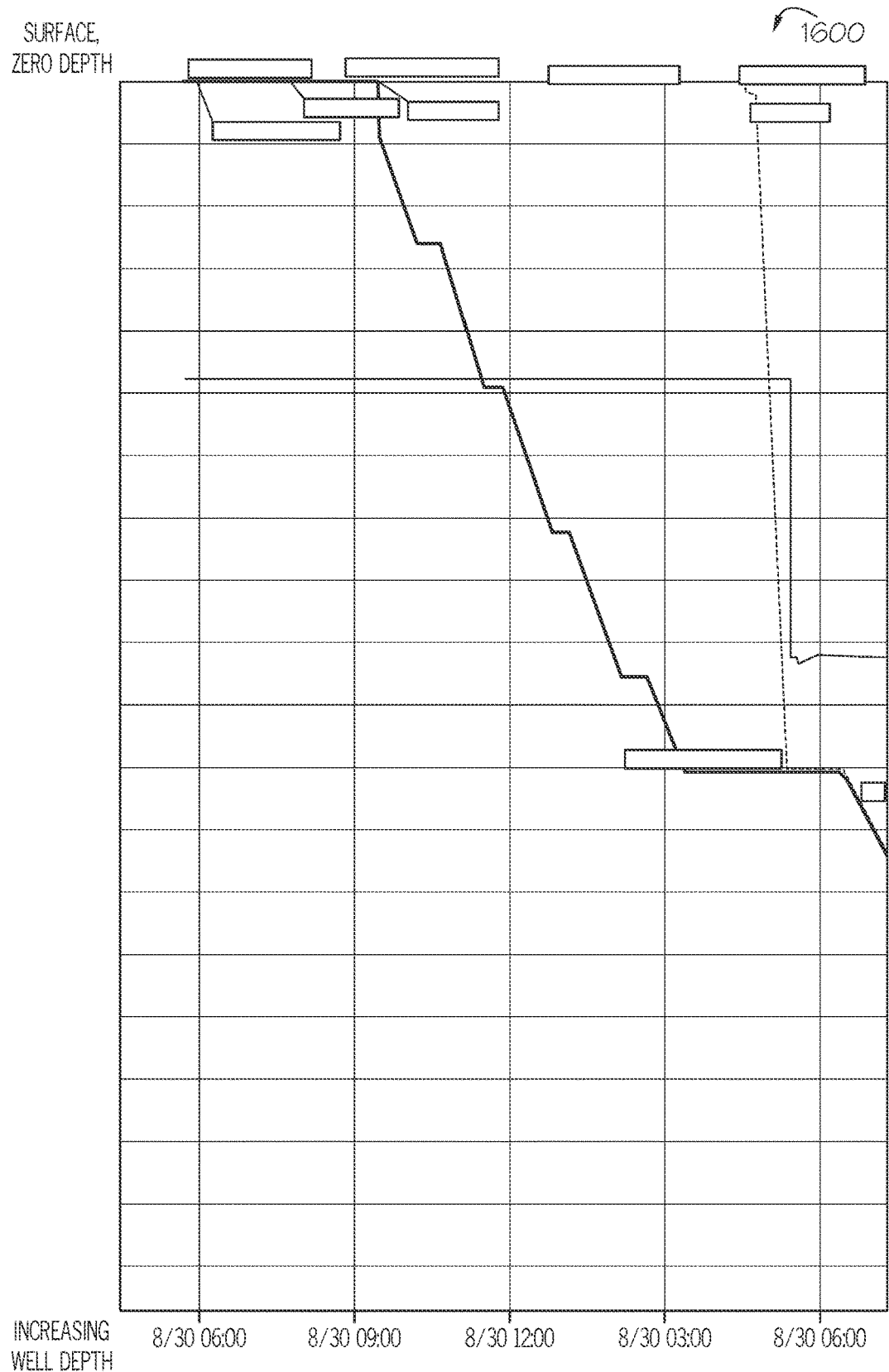
FIG. 16 graphically illustrates an example interface for displaying a part of pipe-conveyed logging run data with events labels and selected data according to one or more embodiments described and illustrated herein; —
Figure 17:
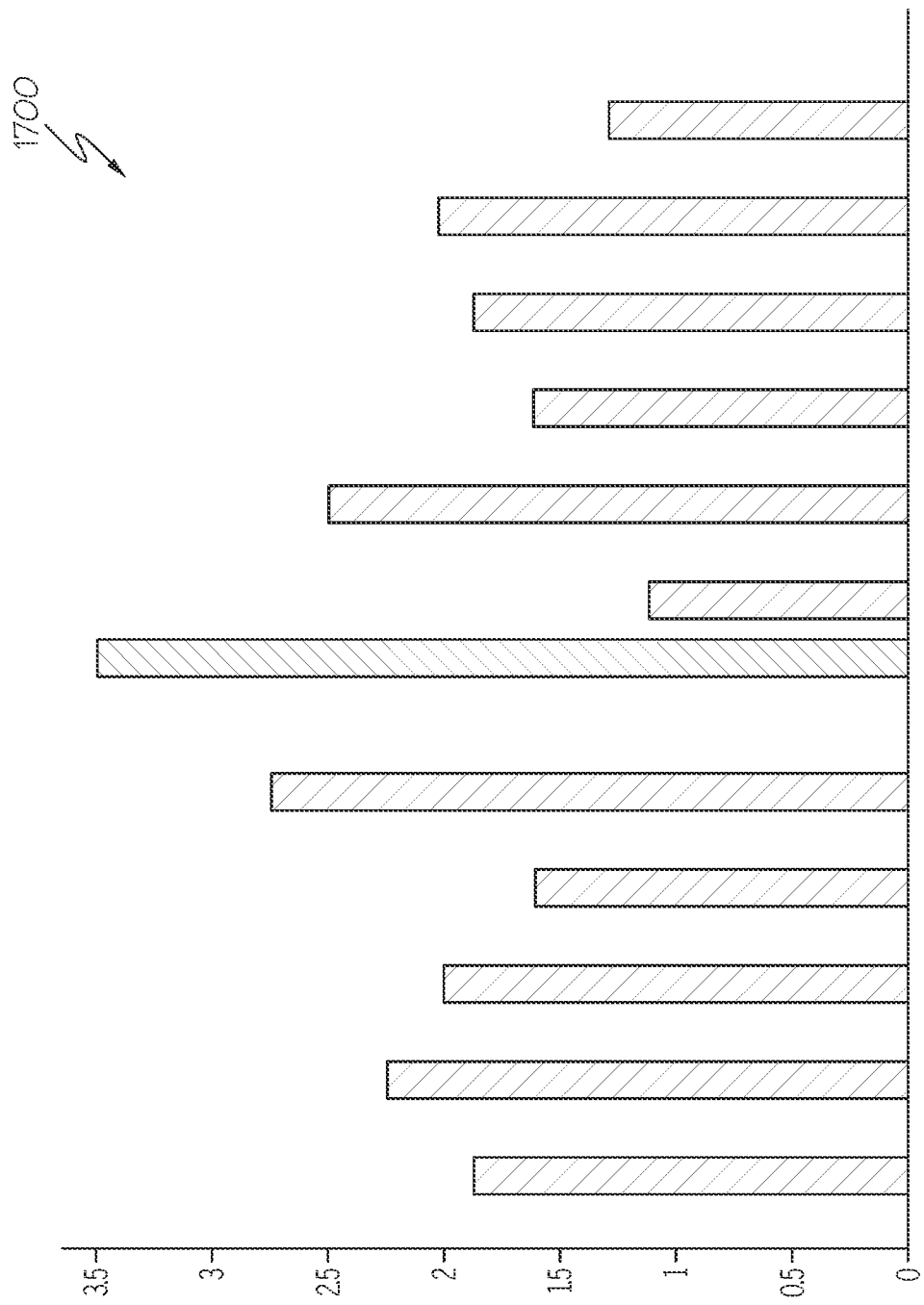
FIG. 17 graphically illustrates an example histogram interface for depicting a set of rig up duration values displayed after filtering data using desired criteria according to one or more embodiments described and illustrated herein.
Figure 18:
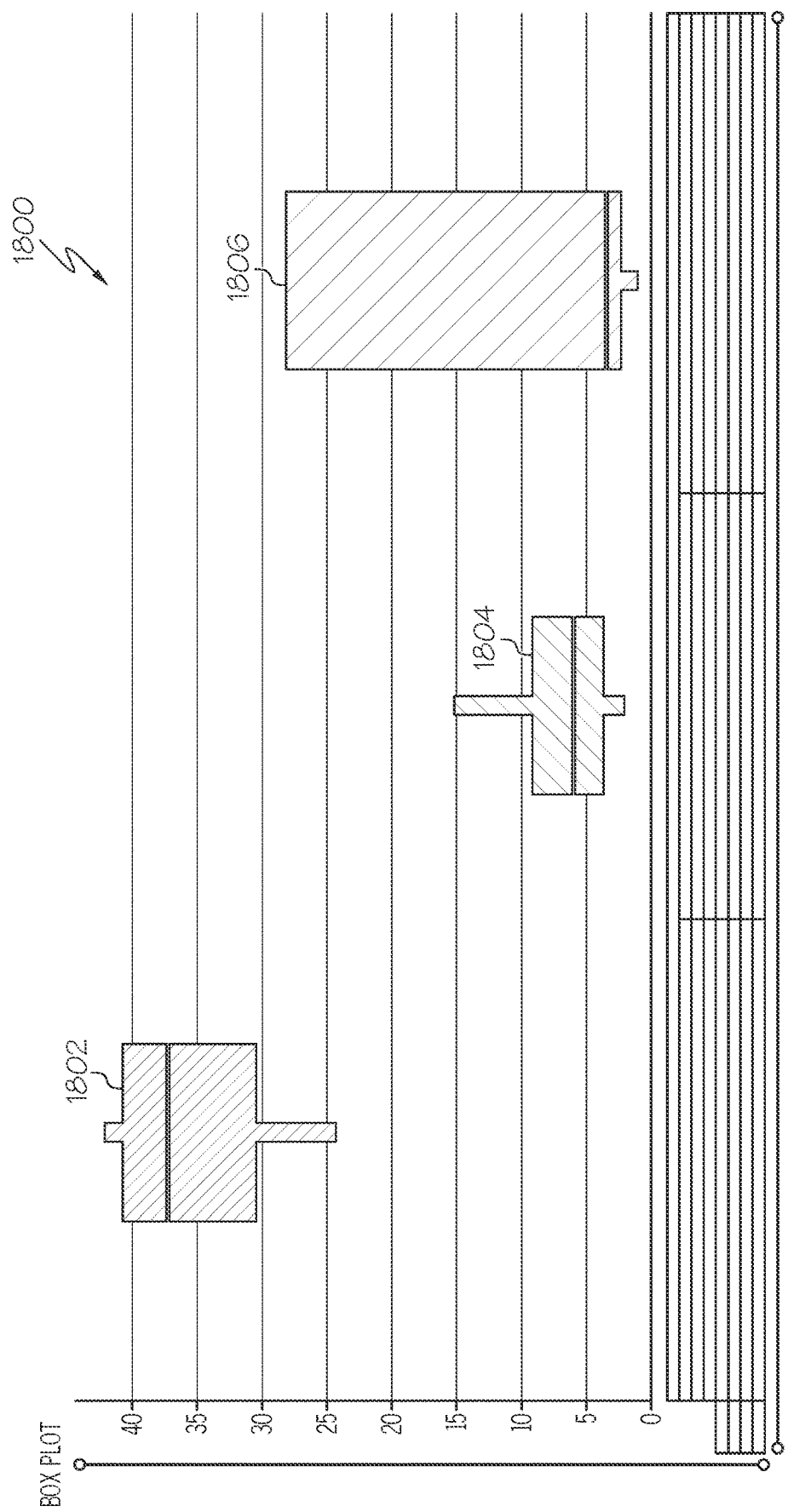
FIG. 18 graphically illustrates an example interface for depicting box-plots for "Tripping between stations" durations for different logging descents and conveyance type according to one or more embodiments described and illustrated herein.

Turning to FIGS. 16, 17, and 18, depicted are exemplary interfaces 1600, 1700, and 1800 associated with described systems and methods, according to disclosed embodiments. In an aspect, well logging operations analytics system 120 may include instructions to render interfaces 1600, 1700, and 1800 and provide one or more graphical input/output tokens to a user. FIGS. 16, 17, and 18 depict interfaces 1600, 1700, and 1800 as exemplary interfaces. It is noted that the interfaces 1600, 1700, and 1800 may be produced by one or more computer applications. According to some embodiments, interfaces 1600 (which describes extract of pipe-conveyed logging run with events labels and selected data), 1700 (which describes a set of rig up duration values displayed after filtering data using desired criteria), and 1800 (which may depict box-plots 1802, 1804, 1806 for "Tripping between stations" durations for different logging descents and conveyance type or different tools) may be provided within the interface 300, as a pop-up window, on a display screen of a different computing device, or the like. It is noted that interfaces 1600, 1700, and 1800 may be displayed by a display screen of a computing device (e.g., input/output hardware 112 of control system 110).

According to embodiments, system 100 may load joined, load and join large data, or load and reduce (e.g., make more efficient) content. In an example, system 100 may sample data at a one second sampling rate such that a single one week job may contain over 600,000 entries, or over 10,000 entries utilizing minute sampling rate. The system 100 may utilize labelled data according to a hierarchical taxonomy. System 100 may provide one or more of interfaces 1600, 1700, or 1800 as part of or as one of a dashboard. For instance, system 100 may provide one or more sets of visualizations to perform typical exploratory data analysis, employ set of statistics, data mining and machine learning approaches (analysis of variance, regressions and time series analysis, principal components, clustering, association mining, ensemble trees, deep learning etc.). System 100 may benchmark events based on historic data or expected results. System 100 may, additionally, update benchmarks based on newly acquired information. As described herein, system 100 may identify influencing factors for events, notify users of influencing factors, and the like. Influencing factors may allow for comparative analysis and identifying of causes of incidents, or the like. For example, the duration of the logging tools rig up operation may vary due to different factors, such as number of joint connections, length of tool modules, and means of rig up, time of the day and season, rig layout, as well as crew efficiency.

It is also noted that recitations herein of "one or more" components, elements, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of well logging operations, the method comprising:
   receiving, using one or more processors, data identifying parameters for an event related to a downhole well;
   identifying a classification for the event from a hierarchical taxonomy of well operation classifications of events, based at least in part on the data identifying the parameters;
   comparing the data identifying the parameters for the event to historic data related to a plurality of events identified with the classification to determine one or more performance parameters for the event; and
   in response to the one or more performance parameters exceeding a threshold identifying a target performance, identifying at least one of a quality incident or influence factor related to the one or more performance parameters exceeding the threshold.

2. The method of claim 1, further comprising:
   displaying, on an electronic display, a graphical representation of composite well log signatures, and
   receiving input to at least one of place, move, or delete an event on the graphical representation of composite well log signatures.

3. The method of claim 1, further comprising:
   displaying, on an electronic display, a graphical representation of the hierarchical taxonomy for selection of the classification, and
   receiving an indication of the classification from the electronic display.

4. The method of claim 1, wherein the hierarchical taxonomy includes a tree of events, and wherein only terminal nodes may be selectable as the classification.

5. The method of claim 1, wherein identifying at least one of a quality incident or influence factor related further comprises determining a probability that the influence factor is a cause for the one or more performance parameters exceeding the threshold identifying the target performance, and in response to the probability exceeding a probability threshold, identifying the influence factor.

6. The method of claim 1, wherein receiving data identifying parameters for the event related to the downhole well, includes receiving at least one of logging job parameters, drilling parameters, or high resolution logging data.

7. The method of claim 6, wherein receiving the data further comprises receiving the data from a well tool or surface acquisition sensor.

8. The method of claim 1, further comprising identifying the classification from a plurality of classifications of the hierarchical taxonomy based on a weighted model configured to select the classification based on at least one of the data identifying parameter or a historical record of parameters related to past events.

9. The method of claim 1, further comprising, displaying, on an electronic display, a graph of selected parameters of the parameters for an even and graphical representations of events associated with parameters at points along the graph.

10. The method of claim 1, further comprising predicting improvements to the event based on the data identifying the parameters and sending a notification of the improvements to at least one party.

11. The method of claim 1, further comprising lowering at least one well tool into the downhole well, and wherein the data identifying the parameters includes well survey data recorded by the at least one well tool.

12. The method of claim 1, further comprising collecting the historic data; and developing of automatic well logging operations events recognition models based on the historic data.

13. A system comprising:
   one or more processors; and
   one or more memory modules comprising non-transitory computer-readable medium storing instructions that, when executed by the one or more processors, cause the one or more processors to:
      receive data identifying parameters for an event related to a downhole well;
      identify a classification for the event from a hierarchical taxonomy of well operation classifications of events, based at least in part on the data identifying the parameters;
      compare the data identifying the parameters for the event to historic data related to a plurality of events identified with the classification to determine one or more performance parameters for the event; and
      in response to the one or more performance parameters exceeding a threshold identifying a target performance, identify at least one of a quality incident or influence factor related to the one or more performance parameters exceeding the threshold.

14. The system of claim 13, wherein the hierarchical taxonomy includes a tree structure, and wherein terminal nodes of the tree structure are identifiable as the classification.

15. The system of claim 14, wherein the tree structure includes a plurality of nodes related to unintended events.

16. The system of claim 15, wherein the computer-readable instructions further cause the one or more processors to identify an unintended event from the plurality related to unintended events based on the data identifying parameters for the event.

17. The system of claim 13, wherein the computer-readable instructions further cause the one or more processors to
   identify the quality incident based on determining a deviation of a time period for the event exceeds a threshold deviation from a benchmark associated with past events having the classification; and
   determine the benchmark associated with the past events based on a calculated metric of time periods for the past events.

18. A system comprising:
   one or more processors; and
   one or more memory modules comprising non-transitory computer-readable medium storing instructions that, when executed by the one or more processors, cause the one or more processors to:
      receive data identifying parameters for an event related to a downhole well;
      displaying, on an electronic display, a graphical representation of a hierarchical taxonomy for selection of a selected classification for the event, wherein the hierarchical taxonomy includes a plurality of classifications of well operation;

receiving input identifying the selected classification for the event;

compare the data identifying the parameters for the event to historic data related to a plurality of events identified with the selected classification to determine one or more performance parameters for the event; and in response to the one or more performance parameters exceeding a threshold identifying a target performance, identify at least one of a quality incident or influence factor related to the one or more performance parameters exceeding the threshold.

19. The system of claim 18, wherein one or more performance parameters includes a temporal parameter, and wherein the one or more influence factor includes at least one of equipment associated with the event, personnel associated with the event, location associated with the event, a rig identifier associated with the event, season associated with the event, or weather associated with the event.

20. The system of claim 18, wherein the computer-readable instructions further cause the one or more processors to identify a selected influence factor from the one or more influence factor as a candidate cause for the performance parameters exceeding the threshold.

21. The system of claim 19, wherein the selected influence factor is selected based on calculating a probability that the selected influence factor is the most likely cause.

* * * * *